(12) United States Patent
Wood et al.

(10) Patent No.: US 10,696,801 B2
(45) Date of Patent: Jun. 30, 2020

(54) HYDRATE INHIBITOR CARRYING HYDROGEL

(71) Applicant: COMMONWEALTH SCIENTIFIC AND INDUSTRIAL RESEARCH ORGANISATION, Acton (AU)

(72) Inventors: Colin David Wood, Willetton (AU); Yutaek Seo, Seoul (KR); Wendy Wenjun Tian, Wheelers Hill (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 17 days.

(21) Appl. No.: 15/575,704

(22) PCT Filed: May 27, 2016

(86) PCT No.: PCT/AU2016/050414
§ 371 (c)(1),
(2) Date: Nov. 20, 2017

(87) PCT Pub. No.: WO2016/187672
PCT Pub. Date: Dec. 1, 2016

(65) Prior Publication Data
US 2018/0265647 A1 Sep. 20, 2018

(30) Foreign Application Priority Data

May 27, 2015 (AU) ................................ 2015901954
Oct. 20, 2015 (AU) ................................ 2015904294

(51) Int. Cl.
| C09K 8/52 | (2006.01) |
| C08J 3/075 | (2006.01) |
| C08J 3/24 | (2006.01) |
| F17D 1/16 | (2006.01) |

(52) U.S. Cl.
CPC ............... C08J 3/075 (2013.01); C08J 3/24 (2013.01); C09K 8/52 (2013.01); C08J 2333/26 (2013.01); C09K 2208/22 (2013.01); F17D 1/16 (2013.01)

(58) Field of Classification Search
CPC .... C09K 8/685; C09K 2208/22; C09K 8/512; C09K 8/805; C09K 8/887; C09K 8/52; C09K 8/514; C09K 3/18; C09K 8/605; C09K 2208/24; C09K 2208/26; C09K 2208/30; C09K 8/035; C09K 8/08; C09K 8/508; C09K 8/516; C09K 8/524; C09K 8/5756; C09K 8/602; C09K 8/665; C09K 8/68; C09K 8/725; C09K 8/90; C09K 2208/32; C09K 8/12; C09K 8/24; C09K 8/42; C09K 8/467; C09K 8/487; C09K 8/50; C09K 8/5083; C09K 8/5751; C09K 8/582; C09K 8/584; C09K 8/62; C09K 8/66; C09K 8/70; C09K 8/80; C09K 8/88; C09K 8/882; C09K 8/92; E21B 43/267; E21B 33/138; E21B 43/26; E21B 21/00; E21B 33/14; E21B 37/06; E21B 43/00; E21B 43/12; E21B 43/16; E21B 43/24
See application file for complete search history.

(56) References Cited

U.S. PATENT DOCUMENTS

| 2003/0092584 A1* | 5/2003 | Crews ................... C09K 8/685 507/200 |
| 2006/0065396 A1 | 3/2006 | Dawson et al. |
| 2013/0105027 A1 | 5/2013 | Fang et al. |
| 2014/0069643 A1* | 3/2014 | Ogle ....................... C09K 8/52 166/278 |

FOREIGN PATENT DOCUMENTS

| WO | WO2013/192634 | * 12/2013 |
| WO | WO 2013/192634 | * 12/2013 |
| WO | WO 2014/116508 | 7/2014 |

OTHER PUBLICATIONS https://en.wikipedia.org/wiki/Hydrogel p. 1 downloaded on Jul. 15, 2019.*
An Extended European Search Report dated Nov. 7, 2018, in a corresponding European Application No. 16798962.3 (9 pages).
Su et al., "Reversible Hydrogen Storage in Hydrogel Clathrate Hydrates" Advanced Materials, vol. 21: pp. 2382-2386 (2009).
Gordienko et al., "Towards a Green Hydrate Inhibitor: Imaging Antifreeze Proteins on Clathrates" PLoS One, vol. 5, Issue 2: pp. 1-7 (Feb. 2010).
Lou et al., "Synthesis of Effective Kinetic Inhibitors for Natural Gas Hydrates" Energy & Fuels, vol. 26: pp. 1037-1043 (2012).
International Search Report of the ISA for PCT/AU2016/050414, dated Aug. 5, 2016, 4 pages.
Search Report for AU 2015901954, dated Sep. 18, 2015, 10 pages.
Abstract of Seo et al. "Preventing Gas Hydrate Agglomeration with Polymer Hydrogels", Energy Fuels, Jun. 26, 2014, vol. 28, No. 7, pp. 4409-4420.
Abstract of Kim et al. "Synergistic Hydrate Inhibition of Monoethylene Glycol with Poly(vinylcaprolactam) in Thermodynamically Underinhibited System", The Journal of Physical Chemistry B, 2014, vol. 118, No. 30, pp. 9065-9075.
Kelland, "History of the Development of Low Dosage Hydrate Inhibitors" Enegy & Fuels, vol. 20, No. 3: pp. 825-847 (2006).
Perrin et al., "The chemistry of low dosage clathrate hydrate inhibitors" Chem. Soc. Rev., vol. 42: pp. 1996-2015 (2013).
Seo et al., "Preventing Gas Hydrate Agglomeration with Polymer Hydrogels" Energy & Fuels, vol. 28: pp. 4409-4420 (2014).
Sheng et al., "Arrays of Polyacrylamide Hydrogels Using a Carbodiimide-Mediated Crosslinking Reaction" Journal of Applied Polymer Science, No. 40416: pp. 1-11 (2014).

* cited by examiner

Primary Examiner — Kumar R Bhushan
(74) Attorney, Agent, or Firm — Nixon & Vanderhye P.C.

(57) ABSTRACT

A gas hydrate hydrogel inhibitor comprising at least one polymer hydrogel particle having from 50 to 100% hydrogel content, the at least one polymer hydrogel particle including an inhibitor selected from the group consisting of: at least one thermodynamic hydrate inhibitor, at least one kinetic hydrate inhibitor, or a combination thereof.

20 Claims, 15 Drawing Sheets

HYDRATE INHIBITOR CARRYING HYDROGEL

The present application is a U.S. national phase of International Application No. PCT/AU2016/050414, filed on 27 May 2016, which designated the U.S. and claims priority to Australian Provisional Patent Application No. 2015901954 filed on 27 May 2015 and Australian Provisional Patent Application No. 2015904294 filed on 20 Oct. 2015, the entire contents of each of which are incorporated herein by reference.

CROSS-REFERENCE

The present application claims priority from Australian Provisional Patent Application No. 2015901954 filed on 27 May 2016 and Australian Provisional Patent Application No. 2015904294 filed on 20 Oct. 2015, the contents of which are to be understood to be incorporated into this specification by this reference.

TECHNICAL FIELD

The present invention generally relates to hydrogel particles which include a gas hydrate formation inhibitor and a method of use of those particles to mitigate hydrate formation and deposition in pipelines transporting hydrocarbons. The invention is particularly applicable in the transport of hydrocarbons through flowlines and pipelines and it will be convenient to hereinafter disclose the invention in relation to that exemplary application. However, it is to be appreciated that the invention is not limited to that application and is applicable to any application in which it is desired to mitigate, and/or inhibit the formation of gas hydrate.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Gas hydrates or clathrate hydrates are nonstoichiometric crystalline inclusion compounds composed of a hydrogen-bonded water lattice which can trap small molecules within its cavities. These small molecules may be gases such as light hydrocarbon molecules including methane, ethane, propane, and other low molecular weight gases that may be present such as $H_2S$, $CO_2$, $N_2$ or the like. Clathrate hydrates are formed at high pressures and low temperatures and are capable of storing large amounts of these gases under reasonable conditions. They have been studied extensively over the past few years for a number of applications including gas storage and separation.

Clathrate hydrate formation commonly occurs in the offshore pipelines transporting hydrocarbons from oil and gas wells because the thermodynamic environment in these pipelines favours clathrate hydrate formation. The formation of clathrates hydrates in this environment is often problematic as the hydrates often agglomerate and plug the pipeline upon deposition into the wall. Remediation can be time-consuming, expensive, and dangerous depending on the location and extent of the blockage. Not only can hydrate plugs interrupt production, they can be a safety risk if not remediated properly. It is particularly important to avoid the plug dislodging and travelling down the line at high speed due to differential pressure across the plug. This can cause catastrophic failure, resulting in equipment damage, injury, and even loss of life. It is therefore essential to implement a strategy to prevent or manage hydrates for uninterrupted production in a safe and cost-effective manner.

Current industry practice in avoidance of hydrate blockages in offshore flowlines transporting hydrocarbon fluids involves the thermal management of hydrocarbon fluids via insulation of flowlines and/or injection of thermodynamic hydrate inhibitors (THIs) such as methanol and monoethylene glycol (MEG) into the hydrocarbon fluid flow. The THIs flow along the pipeline where inhibition occurs. Monoethylene glycol (MEG) is a well-known thermodynamic hydrate inhibitor which is able to shift the hydrate equilibrium curve, delay the hydrate onset and lower the hydrate fraction at various concentrations (20~40 wt %), which is indicative of kinetic control over the formation of hydrate. Controlling the formation process of hydrates is almost impossible without adding hydrate inhibitors. However, significant quantities of THIs must be injected to effectively inhibit hydrate formation. Furthermore, whilst the THIs solution (for example MEG) can be regenerated, this is a costly and complex process that involves removing water, salts, and hydrocarbons. There are also a number of issues in terms of distillation efficiency. Furthermore, prediction of hydrate plug formation under flow is complex.

Alternative hydrate prevention strategies involve hydrate risk management, where the hydrates are allowed to form, but the formation is delayed or the agglomeration is prevented before blocking flowlines. These strategies involve the use of kinetic hydrate inhibitors (KHIs) and/or anti-agglomerants (AAs).

KHIs are typically water soluble, low molecular weight polymers such as homo- and co-polymers of the N-vinyl pyrrolidone and N-vinyl caprolactam whose active groups delay the nucleation and growth of hydrate crystals. KHIs delay hydrate formation for a length of time, known as the "induction time". The length of the induction time depends primarily on the subcooling of the system. Higher subcooling results in shorter hold times and thus may not be effective at subcoolings larger than 14° C. Moreover, while they have been applied in offshore fields successfully, their performance can be affected by the presence of other chemicals such as corrosion inhibitors.

AAs are surfactants, which cause the water phase to be dispersed in hydrocarbon phase as fine droplets inducing their formation into small dry hydrate particles when the temperature decreases below hydrate equilibrium condition. AAs do not prevent hydrate formation but are effective in pipelines because the hydrate remains as a transportable slurry of particles dispersed in the liquid hydrocarbon phase thus preventing hydrate blockage. AAs based on quaternary ammonium surfactant have been deployed in a number of oil fields. However they are considered to be ineffective at high water volume fraction (~60 vol. %) in liquid phase and also affected by the composition of the fluids.

Seo et al (2014) ("Preventing Gas Hydrate Agglomeration with Polymer Hydrogels", Energy & Fuels, 28, pp 4409-4420) reports a method of using hydrogel particles for preventing their agglomeration after formation. The particles were synthesized using a known hydrogel hydrate production approach (see J. Appl. Polym. Sci. 131, 12) and swell to a controlled degree in water and remain discrete. The hydrogel particles consisted of a polymer network swelled with pure water. Hydrate formation occurred on the surface of the hydrogel particles in a well-controlled manner and the shell and polymer network help to prevent agglomeration and deposition of these hydrate shell-covered particles. This differs from anti-agglomerants (AAs) because it does not use any surfactants.

International patent publication WO2013/192634A2 entitled "Self-suspending proppants for hydraulic fracturing" teaches modified proppants for hydraulic fracturing, comprising a proppant particle and a hydrogel coating, wherein the hydrogel coating localizes on the surface of the proppant particle to produce the modified proppant. The proppant particles can be solids such as sand, bauxite, sintered bauxite, ceramic, or low density proppant. Alternatively or additionally, the proppant particle comprises a resin-coated substrate. Optionally, the modified proppant further comprises further comprise an alcohol selected from the group consisting of ethylene glycol, propylene glycol, glycerol, propanol, and ethanol. The hydrogel is formed as a coating on the surface of the proppant particle and functions to assist with pumping and placement of the proppant particle within a fracture. The main functionality of such a system concerns functionality of the proppant within a suspension fluid, rather than modifying the properties of the overall suspension fluid as achieved by anti-agglomerants (AAs).

It would therefore be desirable to provide an improved and/or alternate gas hydrate inhibitor system.

SUMMARY OF THE INVENTION

A first aspect of the present invention provides a gas hydrate inhibitor comprising at least one polymer hydrogel particle having from 50 to 100% hydrogel content (the hydrogel consists of a polymer network (0.1 w/w % to 50 w/w %) and an aqueous phase consisting of water, water and thermodynamic inhibitor, water and kinetic hydrate inhibitors or mixtures thereof), at least one polymer hydrogel particle including an inhibitor selected from the group consisting of: at least one thermodynamic hydrate inhibitor, at least one kinetic hydrate inhibitor, or a combination thereof.

A second aspect of the present invention provides formulation for mitigating the formation of gas hydrates in a hydrocarbon flow comprising a plurality of polymer hydrogel particles having from 50 to 100% hydrogel content, at least one polymer hydrogel particle including an inhibitor selected from the group consisting of: at least one thermodynamic hydrate inhibitor, at least one kinetic hydrate inhibitor or a combination thereof.

It should be understood that a hydrogel is a water-swollen, and cross-linked polymeric network that exhibits the ability to swell and retain a significant amount of water within its structure, but will not dissolve in water. A hydrogel can typically swell and retain from 50 wt % up to 99 wt % water, more preferably 85 wt % up to 98 wt % water within its structure. It should therefore be appreciated that the hydrogel content of the present invention can therefore consists of a polymer network (0.1 w/w % to 50 w/w %) and an aqueous phase selected from water, water and thermodynamic inhibitor, water and kinetic hydrate inhibitors, or mixtures thereof.

In the present invention a polymer hydrogel is utilized as a versatile base material for hydrate inhibitor to be coupled with either thermodynamic hydrate inhibitor or kinetic hydrate inhibitor. The polymer hydrogel is used to modify the properties of surrounding fluid flow. The polymer hydrogel comprises a major proportion of the hydrogel particle (from 50 to 100%) to ensure that the inhibiting functionality is effectively imparted to that surrounding fluid. The present invention therefore provides an inhibited hydrogel particle and a method use of said particle which includes an aqueous solution comprising at least one inhibitor. Whilst not wishing to be limited to any one theory, the Inventors consider that the inhibitor carrying polymer hydrogel mitigates, preferably prevents the heterogeneous segregation of hydrate from the liquid phase. The base hydrogel structure can also function as an anti-agglomerant due to the discrete nature of the hydrogel particles and that gas hydrates have an affinity to form hydrate shells on hydrogels particles (see below). An inhibitor such as MEG is therefore transportable in the hydrogel within a pipeline.

The hydrogel inhibitor of the present invention therefore can function to inhibit hydrate formation (due to the presence of the inhibitor) and, if required, mitigate agglomeration of the hydrate if it forms due to the discrete particles and formation of hydrate shell. These functions open up a range of applications in regards to preventing unwanted hydrate formation to develop an advanced hydrate management strategy using inhibitor carrying hydrogel particles of the present invention.

Advantageously, the hydrogel inhibitor of the present invention also allows for the use of less inhibitor compared to conventional direct injection techniques. For example, where MEG is used, it is estimated that MEG containing hydrogel particles according to the present invention reduce the amount of MEG required for inhibition from 40% to 20% in an aqueous phase.

The polymer hydrogel particles have a large polymer hydrogel content in order to effectively impart the inhibition functionality to the surrounding fluid/gas. Again, the hydrogel content preferably consists of a polymer network (0.1 w/w % to 50 w/w %) and an aqueous phase consisting of water, water and thermodynamic inhibitor, water and kinetic hydrate inhibitors or mixtures thereof. The polymer hydrogel is not a thin layer or coating as described in WO2013/192634A2, but rather comprises from 50 to 100% of the polymer hydrogel particle. In some embodiments, each polymer hydrogel particle comprises from 70 to 100% hydrogel content, preferably from 80 to 100% hydrogel content, more preferably from 90 to 100% hydrogel content, yet more preferably from 95 to 100% hydrogel content. In some embodiments, the present invention provides a gas hydrate inhibitor which consists essentially of at least one polymer hydrogel particle, the at least one polymer hydrogel particle including an inhibitor selected from the group consisting of: at least one thermodynamic hydrate inhibitor, at least one kinetic hydrate inhibitor, or a combination thereof.

The major hydrogel composition of the hydrogel particle enables the hydrogel particle to swell with a water. In embodiments, the hydrogel particle can typically swell and retain from 50 wt % up to 99 wt % water, more preferably 85 wt % up to 98 wt % water within its structure.

The inhibitor can be included in the hydrogel particle in a variety of ways. In most cases the inhibitor is preferably either absorbed into and/or formed with the hydrogel particle. In some embodiments, the inhibitor is absorbed into the hydrogel particle, typically as part of an aqueous solution. THIs are preferably included in a hydrogel particle in this manner. In other embodiments, the inhibitor can be included during the formation of the hydrogel particle. For example, in some embodiments, the inhibitor can be included as an additive to a polymer solution when the hydrogel particle is formed through the addition of a cross-linking agent to that solution (see below). KHIs are preferably included in a hydrogel particle in this manner.

In other embodiments, the inhibitor is included in the cross-linked polymer structure of the hydrogel. The hydrogel can preferably comprises a cross-linked polymer where the polymer network is the inhibitor. For example, in some embodiments the structure of the hydrogel includes and more preferable comprises a KHI. Suitable KHI structures include homo and copolymers of one or more of the following VinylCaprolactam, N-isopropylacrylamide or VinylPyrrolidone, such as PVinylCaprolactam, Poly(N-isopropylacrylamide) or PVinylPyrrolidone.

The cross-linked polymer structure of the hydrogel preferably comprises between 0.01% and 50% cross-linker, with the remaining content comprising the KHI polymer network that forms the basis of the hydrogel. A lower cross-linker content will likely result in the hydrogel falling apart. A higher cross-linker content will likely result in the hydrogel becoming too rigid. In some embodiments, the cross-linked polymer structure of the hydrogel preferably comprises between 0.01% and 20% cross-linker, with the remaining content comprising the KHI polymer hydrogel.

In embodiments, the final modulus of the hydrogel after cross-linking can be from 0.1 Pa up to 12000 Pa as measured by rheological techniques described herein. It should be appreciated that the term "modulus of elasticity" or "modulus," as used in this specification and appended claims, refers to Young's modulus of elasticity, a standard measure of elasticity known to persons of ordinary skill in the art. The unit for expressing "modulus" or "modulus of elasticity" is the pascal (Pa), a unit known to persons of ordinary skill in the art (1 pascal=1 N/$m^2$, where N=Newton and m=meter). A practical unit used in this application is the megapascal (MPa; 1 MPa=1×$10^6$ Pa). 1 MPa is approximately equal to $10^2$ g/$mm^2$ or 1×$10^7$ dynes/$cm^2$. As it pertains to this application, modulus is measured and expressed for fully hydrated hydrogel material, unless otherwise specified. In embodiments, the final modulus of the hydrogel after cross-linking is at least 0.1 Pa, preferably at least 10 Pa, more preferably at least 30 Pa, even more preferably at least 50 Pa and yet even more preferably at least 100 Pa. In embodiments, the final modulus of the hydrogel after cross-linking is no more than 12,000 Pa, more preferably no more than 10,000 Pa, even more preferable no more than 8000 Pa and yet even more preferably no more than 6000 Pa. In some embodiments, the final modulus of the hydrogel after cross-linking can be from 0.2 Pa up to 12000 Pa, preferably 0.2 Pa up to 10000 Pa, more preferably 0.2 Pa up to 5000 Pa, more preferably 1 Pa up to 12000 Pa, yet more preferably 1 Pa up to 10000 Pa as measured by rheological techniques. In some embodiments, the final modulus of the hydrogel after cross-linking can be from 10 Pa up to 12000 Pa, more preferably 10 Pa up to 10000 Pa, yet more preferably 100 Pa up to 10000 Pa as measured by rheological techniques described herein. In other embodiments, the final modulus of the hydrogel after cross-linking can be from 0.1 Pa up to 10000 Pa, preferably 0.1 Pa up to 5000 Pa, 0.1 Pa up to 1000 Pa, more preferably 1 Pa up to 12000 Pa, more preferably 1 Pa up to 10000 Pa, more preferably 100 Pa up to 12000 Pa, yet more preferably 500 Pa up to 12000 Pa, yet more preferably 1000 Pa up to 12000 Pa as measured by rheological techniques described herein. In other embodiments, the final modulus of the hydrogel after cross-linking can be from 1 Pa up to 5000 Pa, more preferably 10 Pa up to 5000 Pa, yet more preferably 100 Pa up to 5000 Pa as measured by rheological techniques described herein. In some embodiments, the final modulus of the hydrogel after cross-linking is no more than 9,000 Pa, more preferably no more than 5,000 Pa, even more preferable no more than 4000 Pa as measured by rheological techniques described herein.

Whilst a number of rheological techniques can be used to determine the modulus of a hydrogel, it should be understood that rheological techniques refers to rheology measurements of a hygrogel, typically in bulk gel form, using a Rheometer, for example a HR-3 Discovery Hybrid Rheometer (TA Instruments). A Rheometer can be used to control shear stress or shear strain and/or apply extensional stress or extensional strain and thereby determine mechanical properties of a hydrogel including the modulus of elasticity thereof.

An inhibitor of the present invention delays, mitigates and/or inhibits the formation of a gas hydrate in a hydrocarbon fluid. For effective inhibition, an inhibitor should preferably delay the hydrate onset time longer than the onset time of uninhibited system. For effective inhibition, an inhibitor should preferably delays the hydrate onset time by at least 10 mins, more preferably at least 30 mins compared to the uninhibited system, or prevent hydrate formation completely. In embodiments, an inhibitor preferably delays the hydrate onset time by at least 15 mins, preferably at least 20 mins, more preferably at least 25 mins compared to the uninhibited system. In embodiments, an inhibitor preferably delays the hydrate onset time by at least 28 mins, preferably at least 35 mins, more preferably at least 40 mins compared to the uninhibited system. The performance of kinetic hydrate inhibition is typically estimated from laboratory measurement data with desired cooling rate. In some embodiments, the obtained onset time was 20 min for the cooling rate of 0.25° C./min for an uninhibited aqueous system. Therefore the preferred onset time for effective inhibition would be longer than 20 mins, preferably 30 mins compared to the uninhibited system, or prevent hydrate formation completely. In embodiments, where the gas hydrate hydrogel inhibitor includes a kinetic hydrate inhibitor, the hydrate onset time preferably is longer than that of uninhibited system. The onset time is preferably in range of 20 to 60 min, more preferably 30 to 60 mins.

Additionally, an inhibitor should preferably increase the subcooling temperature by at least 2° C., more preferably >10° C. relative to the system without inhibitor as measured using the same instrument. In some embodiments, an inhibitor increases the subcooling temperature by at least 5° C., preferably at least 8° C., more preferably at least 12° C. relative to the system without inhibitor as measured using the same instrument. In some embodiments, an inhibitor increases the subcooling temperature by at least 15° C. relative to the system without inhibitor as measured using the same instrument. It should be appreciated that subcooling is the distance along the temperature axis between the operating point and the Hydrate Pressure and Temperature Curve on a plot of Hydrate Pressure vs Temperature Curve. Hydrate testing protocols are set out in the Examples section (hydrate studies) of this specification. An inhibitor may be defined as preferably having an inhibitor performance (in terms delay in onset time) as equal of greater to the following list of thermodynamic hydrate inhibitors and/or kinetic hydrate inhibitors listed in the following paragraphs.

The inhibitor concentration in the hydrogel can be controlled. In some embodiments the polymer hydrogel particles contain between 5 and 50 wt % of the thermodynamic inhibitor or 0.01 to 5 wt % of kinetic hydrate inhibitor. However, in other embodiments the the polymer hydrogel particles contain between 10 and 30 wt %, preferably between 15 and 25 wt % of the thermodynamic inhibitor or from 0.01 to 10 wt %, preferably from 0.1 to 2 wt %, more preferably 0.5 to 1% of kinetic hydrate inhibitor.

It should be appreciated that a thermodynamic hydrate inhibitor (THI) functions to shift the hydrate phase boundary for the formation of gas hydrates to lower temperatures and higher pressures, delays the hydrate onset and lower the hydrate fraction at various concentrations in a hydrocarbon fluid. For effective THI function, the hydrate onset time should be delayed and the subcooling temperature should increase relative to the system without THI using the same apparatus. More particularly, a THI of the present invention the inhibitor have a preferred a delay in onset time of at least 10 minutes, more preferably at least 30 minutes when evaluated according to hydrate testing protocols set out in the Examples section (hydrate studies) of this specification. The subcooling temperature should increase (by at least 2° C. compared to the uninhibited system, more preferably >10° C.) relative to the system without inhibitor as measured using the same instrument. A THI may be defined as preferably having an inhibitor performance (in terms delay in onset time) as equal of greater to the THIs set out below.

Any number of thermodynamic hydrate inhibitors can be incorporated into the polymer hydrogel. For example, suitable thermodynamic hydrate inhibitors include methanol, mono-ethylene glycol (MEG), diethylene glycol (DEG), or a combination thereof.

It should be appreciated that a kinetic hydrate inhibitor (KHI) functions to delay the nucleation and clathrate growth of hydrate crystals. KHIs are therefore gas hydrate antinucleators. For effective KHI function, the KHI should delay the hydrate onset time relative to the system without inhibitor as measured using the same instrument. More particularly, a KHI of the present invention the inhibitor have a preferred an delay in onset time of at least 10 minutes, more preferably at least 30 minutes when evaluated according to according to hydrate testing protocols set out in the Examples section (hydrate studies) of this specification. A KHI may be defined as preferably having an inhibitor performance (in terms delay in onset time) as equal of greater to the KHIs set out below.

KHIs are typically water soluble, low molecular weight polymers. Any number of kinetic hydrate inhibitors can be incorporated into the polymer hydrogel. suitable kinetic hydrate inhibitors include homo- and co-polymers of N-vinyl pyrrolidone, N-vinyl caprolactam such as Polyvinylcaprolactam, Vinylpyrrolidone, vinylcaprolactam, Inhibex 713 (VCap:VP:DMAEMA terpolymer), Luvicap 55W (BASF): VP:VCap 1:1 copolymer), Inhibex 101 (50 wt. % in butyl glycol ether (PVCap), Inhibex 505, Luvicap 21W (34.6 wt. % VP:VCap 1:2 in $H_2O$ (from BASF)), Inhibex 501 (50 wt. % in butyl glycol ether (from Ashland Chemical Co.), Polyvinylpyrrolidone PVP K90 (from Ashland Chemical Co.), Polyvinylpyrrolidone PVP K15 (from Ashland Chemical Co.), Polyvinylpiperidone (PVPip) Poly(acryloylpyrrolidine), Poly(acryloylmorpholine), Polyaspartamide 4:1 (isobutyl:methyl derivative), PAO-7 (Oligomeric amine oxide), Poly(N-methyl-N-vinyl acetamide), or poly (N-isopropylacrylamide, PNIPAM), or a combination thereof.

Other suitable kinetic hydrate inhibitors can be selected from the group consisting of: Poly(vinylpyrrolidone), Polyvinylcaprolactam, polyethyloxazoline, poly-L-proline, polyacryloylpyrrolidine, polyethylmaleimide, ring-opened polyethyloxazoline, ring-closed polyethyloxazoline, polyetherdiamine, polyallyl isopentanamide, polypyrrolidinyl aspartate (polyAS), polyglyoxylpyrrolidine (polyGP), and dodecyl-2-(2-caprolactamyl) ethanamide.

Further suitable kinetic hydrate inhibitors can be selected from the group consisting of: polyacrylamides including, but not limited to homo and copolymers of ethylacrylaminde, vinyl-N-methylacetamide, diethylacrylamide, isopropylacrylamide, isobutylacrylamide, isopropylmethacrylamide, N-methyl-N-vinylacetamide, butylacrylate; such as polyethylacrylaminde, polyvinyl-N-methylacetamide, polydiethylacrylamide, polyisopropylacrylamide, polyisobutylacrylamide, polyisopropylmethacrylamide, polyN-methyl-N-vinylacetamide. Specific examples of copolymers include copolymers of N-methyl-N-vinylacetamide:vinyl caprolactam (including 1:1 copolymers), copolymers of polyisopropylmethacrylamide: N-vinyl-N-methylacetamide, copolymers of VP: isobutylacrylamide; VIMA: isobutylacrylamide; VP: butylacrylate.

Yet other suitable kinetic hydrate inhibitors can be selected from the group consisting of: modified AMPS polymers where $R^1$ is an alkyl tail of 1 to 6 carbon atoms and $R^2$ is H or Me:

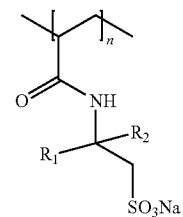

Terpolymer Gaffix VC-713—consisting of the monomer units:

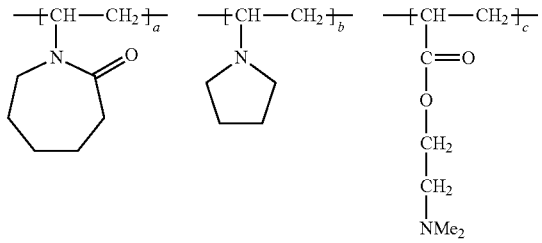

Amidated maleic anhydride copolymers such as:

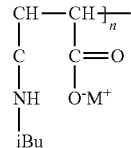

wherein $M^+$ is $H^+$, a metal ion or a quarternary ammonium ion. In some embodiments, the isobutyl group can be exchanged with isopropyl. One example structure comprises:

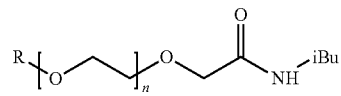

wherein n is from 1 to 1000, preferably between 10 and 100.

In one embodiment, the KHI comprises one or more Antifreeze Protein from the Longhorn Beetle *Rhagium mordax*.

Other suitable KHIs are described in Kelland et al, History of the Development of Low Dosage Hydrate Inhibitors *Energy & Fuels*, Vol. 20, No. 3, 2006, pp 825-847 and Steed et al The chemistry of low dosage clathrate hydrate inhibitors *Chem. Soc. Rev.*, 2013, 42, 1996, the contents of which are to be understood to be incorporated into this specification by each of the above references.

The composition of the polymer hydrogel particles can be tailored to suit a selected application. In embodiments, the polymer hydrogel particles comprise aqueous content of between 70 and 99 wt %, preferably between 75 and 95 wt %, more preferably between 75 and 90 wt %. In embodiments, the polymer hydrogel particles comprise a polymer content of less than 10 wt %, preferably less than 5 wt %.

The polymer content of the polymer hydrogel particles are in part selected to provide suitable mechanical and chemical properties to the particle (see below). In some embodiments, the polymer hydrogel particles comprise a cross-linked polymer used as a hydrogel comprising a plurality of homogenous polymers selected from the group consisting of polyacrylic acid, hydrolyzed polyacrylamide or polyacrylamide-co-acrylic acid, polyacrylamide-co-acrylic acid partial sodium salt, poly(acrylic acid-co-maleic acid), poly(N-isopropylacrylamide, and polyvinyl N-vinyl caprolactam such as Polyvinylcaprolactam, Vinylpyrrolidone, and vinyl-caprolactam.

As noted above, in some embodiments, the hydrogel is formed from a kinetic hydrate inhibitor such as PVinyl-Caprolactam, PNIPAM or PVinylPyrrolidone. In these embodiments, the KHI network retains the hydrogel shape and also functions as a hydrate inhibitor. Here, the KHIs are included during the synthesis of the hydrogel so they are part of the hydrogel network. The concentration of the KHI is preferably between 0.01 to 20 wt %, preferably between 0.1 and 15 wt %, more preferably between 0.2 and 10 wt %, yet more preferably between 0.5 and 10 wt %.

In some embodiments, the cross-linked polymer includes a functionalised agent, the functionalised agent containing at least one pendant functional group having formed a covalent bond with a carboxyl or activated carboxylate group on the cross-linked polymer. The functionalised agent may be a polymer or other organic molecule. In some embodiments, the resulting polymer contains a succinimide ester derivative group that can be both cross-linked and functionalised as described above to form a functionalised cross-linked gel. Similarly, as above the degree of functionalisation of the gel can be readily controlled by changing the level of activation of the polymer. This functionalisation is described in more detail in the detailed description below.

In exemplary embodiments, polymer hydrogel particles comprise a functionalised crosslinked polymer comprising CMC-PAM-co-AA (i.e. N-Cyclohexyl-N'-(2-morpholinoethyl)carbodiimide (CMC), polyacrylic acid (AA) and polyacrylamide (PAM)).

The polymer hydrogel preferably has a controlled particle size and can maintain this morphology in a range of different environments and shear conditions. In embodiments the polymer hydrogel particles preferably have one or more of the following properties: have a mean length diameter of 10 to 2000 μm; has a cross-link density of ≥1 mol %; have a maximum cross-link density of 40 mol %; have a mean length diameter of 10 to 2000 μm; are mechanically robust and remains intact when hydrate formation occurs; are sufficiently mechanically flexible to allow swelling; is stable in different chemical environments, such as in the presence of condensed hydrocarbon liquids and gases such as nitrogen and carbon dioxide; is hydrophilic and is able to contain >75% by weight water. Preferably the polymer hydrogel particles can tolerate high shear rates.

A third aspect of the present invention provides a method of forming a gas hydrate inhibitor comprising:

providing a plurality of hydrogel particles having from 50 to 100% hydrogel content; and swelling the hydrogel particles with an aqueous inhibitor solution including an inhibitor selected from the group consisting of: at least one thermodynamic hydrate inhibitor, at least one kinetic hydrate inhibitor or a combination thereof.

In this third aspect, the gas hydrate inhibitor is formed by the cross-linked polymer particles of a polymer hydrogel, for example CMC-PAM-co-AA, being swelled by mixing in an aqueous inhibitor solution (for example a MEG solution or KHI solution), thereby forming hydrogel particles containing that inhibitor (for example MEG or KHI) inside. The inhibitor content is absorbed into the polymer hydrogel using the aqueous absorption properties of the hydrogel. The inhibitor concentration/content can be varied by varying the concentration of the inhibitor within the aqueous solution the hydrogel is immersed for the swelling process and the time that polymer hydrogel is immersed in that aqueous solution.

In some embodiments, the hydrogel particles are first swelled with an aqueous solution; and then swelled with the inhibitor aqueous solution.

The concentration of the inhibitor in the aqueous inhibitor solution is selected to impart or absorb a desired inhibitor concentration into the hydrogel. In some embodiments, the concentration of the thermodynamic inhibitor in the aqueous inhibitor solution is from 5 to 80 wt %, preferably from 5 to 50 wt %, more preferably 10 to 40%, and yet more preferably from 10 to 30% for the thermodynamic inhibitor. In some embodiments, the concentration of the kinetic hydrate inhibitor in the aqueous inhibitor solution is from 0.01 to 10 wt %, preferably from 0.1 to 2 wt %, more preferably 0.5 to 1%.

A fourth aspect of the present invention provides a method of forming a gas hydrate inhibited hydrogel comprising at least one polymer hydrogel particle having from 50 to 100% hydrogel content the method comprising:

forming a hydrogel with, around, or with and around at least one inhibitor, wherein the inhibitor is selected from the group consisting of: at least one thermodynamic hydrate inhibitor, at least one kinetic hydrate inhibitor or a combination thereof.

In this fourth aspect, the gas hydrate inhibitor is formed with (i.e. during synthesis of) the cross-linked polymer particles of a polymer hydrogel thereby forming hydrogel particles containing that inhibitor (for example MEG or KHI) inside. In some embodiments, the inhibitor can be included as an additive to a polymer solution when the hydrogel particle is formed through the addition of a cross-linking agent to that solution. Here the the gas hydrate inhibitor can be mixed with the cross-linked polymer particles during synthesis of the polymer hydrogel. KHIs are preferably included in a hydrogel particle in this manner. In other embodiments, the inhibitor is included in the cross-linked polymer structure of the hydrogel. For example, in some embodiments the structure of the hydrogel includes and more preferable comprises a KHI. Suitable KHI structures include PVinylCaprolactam, PNIPAM or PVinylPyrrolidone.

The inhibitor preferably comprises a kinetic hydrate inhibitor in this formation method. The concentration of the kinetic hydrate inhibitor is preferably from 0.01 to 10 wt %, preferably from 0.1 to 2 wt %, more preferably 0.5 to 1%.

The hydrogel particles of the third and fourth aspects of the present invention preferably comprise a plurality of cross-linked polymer gel beads. In some embodiments, the polymer gel beads comprise a cross-linked polymer used as a hydrogel. The polymer gel beads preferably comprises a plurality of homogenous polymers selected from the group consisting of polymers containing carboxy groups such as polyacrylic acid, hydrolyzed polyacrylamide or polyacrylamide-co-acrylic acid, polyacrylamide-co-acrylic acid partial sodium salt, and poly(acrylic acid-co-maleic acid) or poly(N-isopropylacrylamide, polyvinyl N-vinyl caprolactam such as Polyvinylcaprolactam, Vinylpyrrolidone, and vinylcaprolactam covalently bonded together.

The polymer gel beads preferably have a controlled particle size and can maintain this morphology in a range of different environments and shear conditions. In embodiments the beads preferably have one or more of the following properties: have a mean length diameter of 10 to 2000 µm; has a cross-link density of 1 mol %; have a maximum cross-link density of 40 mol %; are mechanically robust and remains intact when hydrate formation occurs; are sufficiently mechanically flexible to allow swelling; is stable in different chemical environments, such as in the presence of condensed hydrocarbon liquids and gases such as nitrogen and carbon dioxide; is hydrophilic and is able to contain >75% by weight water. Preferably the beads can tolerate high shear rates. In some embodiments, the polymer gel beads can be recycled.

In embodiments, the hydrogel particles comprise a plurality of beads formed from a cross-linkable polymer, wherein the mean length diameter is 10 to 2000 µm and the standard deviation is +/−20%, wherein there is no need for size selection after synthesis of the plurality of beads. In another aspect the bead, or the plurality of beads, has a mean length diameter of about 10 to about 1000 µm.

Once again, the inhibitor is preferably selected from the group comprising of at least one thermodynamic hydrate inhibitor methanol, mono-ethylene glycol (MEG), or a combination thereof; at least one kinetic hydrate inhibitor comprising homo- and co-polymers of N-vinyl pyrrolidone, N-vinyl caprolactam such as Polyvinylcaprolactam, Vinylpyrrolidone, vinylcaprolactam, Inhibex 713 (VCap: VP:DMAEMA terpolymer), Luvicap 55W (BASF): VP:V-Cap 1:1 copolymer), Inhibex 101 (50 wt. % in butyl glycol ether (PVCap), Inhibex 505, Luvicap 21W (34.6 wt. % VP:VCap 1:2 in $H_2O$ (from BASF)), Inhibex 501 (50 wt. % in butyl glycol ether (from Ashland Chemical Co.), Polyvinylpyrrolidone PVP K90 (from Ashland Chemical Co.), Polyvinylpyrrolidone PVP K15 (from Ashland Chemical Co.), Polyvinylpiperidone (PVPip) Poly(acryloylpyrrolidine), Poly(acryloylmorpholine), Polyaspartamide 4:1 (isobutyl:methyl derivative), PAO-7 (Oligomeric amine oxide), Poly(N-methyl-N-vinyl acetamide), or poly(N-isopropylacrylamide) or a combination thereof or a combination thereof.

The hydrogel particles can be formed using any suitable process. In some embodiments, the hydrogel particles are formed by:
(i) providing a first solution comprising:
  (a) a polymer having a repeating monomer unit comprising at least two different pendant functional groups, wherein at least one of the at least two pendant functional groups is a carboxyl or activated carboxylate group; and
  (b) a cross-linking agent having at least two pendant functional groups capable of forming a covalent bond with a carboxyl or activated carboxylate group;
(ii) reacting the cross-linking agent with the polymer so that a cross-linked polymer is formed,
wherein a desired hydrogel particle size is formed by either:
suspending the first solution within a second solution, wherein the first solution is immiscible with the second solution, then subsequently reacting the cross-linking agent with the polymer; or
freeze drying the cross-linked polymer; and then comminuting the freeze dried cross-linked polymer to form dried hydrogel particles of a desired size.

In a first process, the size of the droplets of the first solution in the second solution determines the final hydrogel particle size. In a second process, the first polymer solution is reacted with a cross-linking agent so that a cross-linked polymer is formed. This polymer is then freeze dried and comminuted, preferably ground to form dried hydrogel particles. The resulting dried hydrogel can subsequently be reswelled.

The method above may further comprise the step of adding a functionalised agent, the functionalised agent containing at least one pendant functional group capable of forming a covalent bond with a carboxyl or activated carboxylate group on the cross-linked polymer. The functionalised agent may be a polymer or other organic molecule. In preferred embodiments, the pendant functional group on the functionalised agent is a primary amine.

In yet other embodiments, the hydrogels are formed from monomers which are cross-linked using suitable techniques such as free radical chemistry. In some embodiments, hydrogels are formed using post-synthetic cross-linking of existing polymers.

The cross-linking agent can comprise any suitable compound with the required pendant functional groups. In embodiments, the pendant functional groups on the cross-linking agent are primary amines, preferably a diamine compound. In some embodiments, at least one of the at least two pendant functional group is an activated carboxylate group, formed by reacting the polymer with a carbodiimide, wherein the carbodiimide covalently bonds to the carboxyl group, forming the activated carboxylate group.

The first solution is preferably an aqueous solution, or a miscible aqueous-organic solvent solution. In some embodiments, the miscible aqueous-organic solvent solution comprises a solvent selected from the group consisting of tetrahydrofuran, isomers of propenol, methanol, ethanol, dioxane, dimethylsulfoximide, dimethylformamide, acetonitrile, acetone, acetic acid, or combinations thereof. The second solution is preferably selected from the group consisting of toluene and straight chain $C_{6-}$ to $C_{8-}$ hydrocarbons, or combinations thereof. In some embodiments, the second solution further comprises a non-ionic surfactant selected from the group consisting of sorbitol esters cellulose butyrate acetate, hydroxyethyl cellulose, cellulose diacetate, 1-Oleoyl-rac-glycerol, 2-cyclohexylethyl β-D-maltoside, polyoxyethylene surfactants, cyclohexylmethyl β-D-maltoside, digitonin, ethylene glycol monododecyl ether, ethylene glycol monohexyl ether, ethylene glycol monooctadecyl ether, polyoxyethylene dodecyl ether, hexaethylene glycol monodecyl ether, Polyoxyethylene isooctylphenyl ether, nonaethylene glycol monododecyl ether, octaethylene glycol monodecyl ether, octaethylene glycol monotetradecyl ether, pentaethylene glycol monodecyl ether, pentaethylene glycol monohexadecyl ether, terpolymers of poly(ethylene glycol)-poly(propylene glycol)-poly(ethylene glycol), polyoxyethylene (20) oleyl ether, polyoxyethylene (20) sorbitan monolaurate solution, polyethylene glycol sorbitan monolaurate, polyethylene glycol trimethylnonyl ether, and polyethylene glycol p-(1,1,3,3-tetramethylbutyl)-phenyl ether.

In some embodiments, the activated carboxylate group has been reacted with a succinimide, to form a succinimide ester derivative group prior to providing the first solution.

Again, in some embodiments, the inhibitor can be included as an additive to the first polymer solution when the hydrogel particle is formed through the addition of a cross-linking agent to that solution. KHIs are preferably included in a hydrogel particle in this manner. In other embodiments, the inhibitor is included in the cross-linked polymer structure of the hydrogel. For example, in some embodiments the structure of the hydrogel includes and more preferable comprises a KHI. Suitable KHI structures include polymers and/or copolymers of at least one of VinylCaprolactam, N-isopropylacrylamide or Vinyl Pyrrolidone.

The present invention also provides a gas hydrate inhibitor according to according to the first or second aspect of the present invention formed from a method according to the third aspect of the present invention.

A fifth aspect of the present invention provides a method of inhibiting hydrocarbon gas hydrate formation comprising:

adding hydrogel particles having from 50 to 100% hydrogel content, the hydrogel particles containing thermodynamic or kinetic hydrate inhibitor according to the first or second aspect of the present invention into a hydrocarbon fluid flow.

In some embodiments, the step of adding comprises injecting the hydrogel particles into the hydrocarbon fluid flow.

At the end of the hydrocarbon pipeline or flowline it is preferred that the hydrogel particles are separated from the hydrocarbon flow for recycling. In some embodiment the process therefore further comprises the step of separating the hydrogel particles from the fluid flow by filtration or centrifugation. The process can then further comprise recovering the polymer content from the hydrogel via solvent extraction. Here, the hydrogel goes to the polymer recovery unit where the polymer will be recovered using solvent and will be reused again. The released free water is transferred to water treatment unit for further processing. The inhibitor, particularly THIs from the hydrogel can also be regenerated. For example, where the inhibitor comprises MEG, a glycol regeneration unit is used to regenerate the MEG. Using the present invention, regeneration of MEG is simplified because the particles are easily filtered thus removing the water and the inhibitor from the hydrocarbon flow. For KHI inhibited particles the KHI is retained in the hydrogel therefore the dried KHI inhibited hydrogel can be recycled.

A sixth aspect of the present invention provides method of mitigating hydrate bed formation and deposition in gas pipelines comprising:

adding hydrogel particles having from 50 to 100% hydrogel content, the hydrogel particles containing thermodynamic or kinetic hydrate inhibitor according to the first or second aspect of the present invention into a pipeline including a hydrocarbon fluid flow.

A seventh aspect of the present invention provides the use of a hydrogel particles containing thermodynamic or kinetic hydrate inhibitor for mitigating hydrate bed formation and deposition in pipelines transporting hydrocarbons, comprising:

adding hydrogel particles containing thermodynamic or kinetic hydrate inhibitor according to the first or second aspect of the present invention into a pipeline including a hydrocarbon fluid flow.

It should be appreciated that the hydrocarbon flow will typically include light hydrocarbons or carbon dioxide for gas hydrates to be particularly problematic. For example, affected hydrocarbon fluid flow typically includes light hydrocarbons (hydrocarbons having the general formula $C_nH_{2n+2}$, where n is from 1 to 10) such as methane, ethane, propane and other gases such as $H_2S$, $CO_2$, $N_2$ and the like. The hydrocarbon can also be a liquid hydrocarbon phase such as crude oil and condensate.

An eighth aspect of the present invention provides method of inhibiting hydrate formation in offshore flowlines comprising adding a gas hydrate inhibitor according to the first or second aspect of the present invention to the offshore pipelines transporting hydrocarbons from oil and gas wells.

Regeneration of MEG is simplified because the particles are easily filtered thus removing the water and MEG from the hydrocarbon stream. Existing infrastructure can be used.

Yet a further aspect of the present invention provides the use of the gas hydrate inhibited hydrogels of the first aspect of the present invention as an anti-agglomerant in the offshore pipelines transporting hydrocarbons from oil and gas wells. In one aspect, the gas hydrate inhibited hydrogels are used as the anti-agglomerant and/or gas hydrate formation inhibitor/suppressant in the offshore pipelines. In another aspect, there is provided a method of suppressing hydrate formation in the offshore pipelines comprising adding the gas hydrate inhibitor of the first aspect of the present invention to the offshore pipelines. In a further aspect, there is provided an anti-agglomerant to prevent pipeline plugging in the transport of natural gas and oil, comprising the gas hydrate inhibitor of the first aspect of the present invention described above. In a yet further aspect, there is provided an gas hydrate formation inhibitor to prevent pipeline plugging in the transport of natural gas and oil, comprising the gas hydrate inhibitor of the first aspect of the present invention described above.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
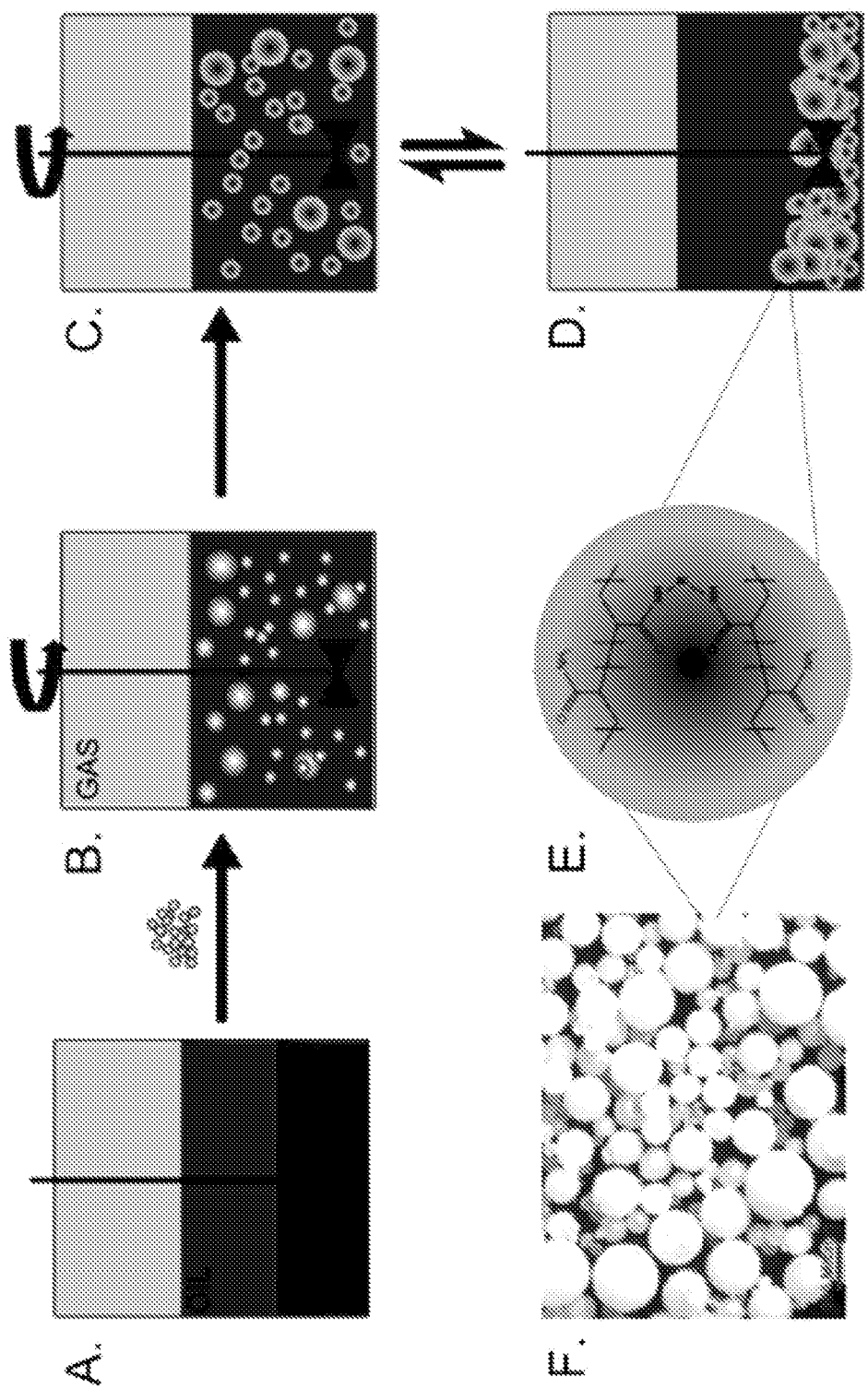
FIG. 1 provides a schematic showing surfactant-free prevention of hydrates agglomeration using hydrogel particles: (A) Before hydrate formation with an aqueous phase, decane to simulate an oil phase and headspace; (B) Dry particles are added to the water which is absorbed (as shown in blue) under stirring to form hydrogel particles and the system is pressurized; (C) Gas diffusion into the particles (shown in grey) and hydrate formation within the particles; (D) Hydrate particles do not agglomerate even when stirring stopped (fully reversible between C and D); (E) Chemical structure of the hydrogel particles (5%; w/v, polymer/water); and (F) Optical microscope image of dried hydrogel particles (scale bar 300 μm) prior to swelling for hydrate experiments.

The present invention relates to a gas hydrate inhibitor in the form of a hydrogel particle which incorporates a thermodynamic and/or kinetic gas hydrate inhibitor therein. This gas hydrate inhibitor formulation has thermodynamic and/or kinetic hydrate inhibition performance coupled with an anti-agglomeration performance which is inherent in the properties of the base hydrogel particles. Such inhibited hydrogel particles open up a range of applications in regards to preventing unwanted gas hydrate formation and deposition in a variety of areas including transportation of hydrocarbons in flow lines and pipelines. The polymer hydrogel comprises a major proportion of the hydrogel particle (from 50 to 100%) to ensure that the inhibiting functionality is effectively imparted to that surrounding fluid.

Whilst not wishing to be limited to any one theory, the Inventors consider that the inhibitor carrying polymer hydrogel mitigates, preferably prevents the heterogeneous segregation of hydrate from the liquid phase. The base hydrogel structure can also function as an anti-agglomerant due to the discrete nature of the hydrogel particles and that gas hydrates have an affinity to form hydrate shells on hydrogels particles. In this regard, the formation of hydrates in the presence of hydrogel particles can prevent the agglomeration of hydrates by absorbing the aqueous phase into hydrogel particles dispersed in a liquid hydrocarbon phase. The hydrates form as a surface shell on the hydrogel particles and grow inward. The hydrate shell-covered hydrogel particles tend to resist agglomeration or deposit in a hydrocarbon flow because the particles remain discrete due to the polymer network.

The inhibited hydrogel particles of the present invention can be used to inhibit hydrate formation in flowlines and pipelines transporting hydrocarbons, for example in the gas industry (onshore and offshore). In this application, the inhibited hydrogel particles of the present invention are added to and mixed into a hydrocarbon flow. The thermodynamic and/or kinetic hydrate inhibition performance of the inhibitor contained in the hydrogel particles coupled with the anti-agglomeration performance of the base hydrogel particles assists to mitigate hydrate bed formation and deposition in the flowlines and pipelines.

As noted above, the properties provided by the hydrogel particles are two-fold:

Firstly, the base structure of the hydrogel particles of the present invention can be used as an anti-agglomerant for reducing the plugging of pipelines due to hydrate formation. The hydrogel particles absorb water from within the pipeline, this causes them to swell. The hydrogel particles are stable, do not agglomerate, are discrete and are able to flow through the pipeline. The presence of the hydrogel particles inhibits the formation of gas hydrates in the pipeline and if conditions are such as hydrate formation occurs they can manage the hydrate as discrete particles. As such, blockage of the pipeline due to the formation and agglomeration of gas hydrates is prevented. The hydrogel particles can then be separated, deswelled and recycled.

Secondly, the thermodynamic and/or kinetic hydrate inhibition performance of the inhibitor contained in the hydrogel particles function to inhibit the formation of the gas hydrate within the flowline or pipeline through the functional chemistry of the inhibitor.

In such a strategy, the inhibitor hydrogel particles with a suitable particle size/diameter are injected into subsea flowline including a hydrocarbon fluid flow and be entrained within that flow. In this respect, the hydrogel particles are preferably: discrete with a narrow particles size distribution (+/−20% variation in the size range 10 to 1000 μm); mechanically robust and remain intact when hydrate formation occurs, this requires a cross-link density of ≥about 1 mol %; mechanically flexible enough to swell; have a maximum cross-link density of 40 mol %; are able to tolerate high shear rates; are stable in different chemical environments (e.g., presence of condensed hydrocarbon liquids and other gases such as nitrogen and carbon dioxide); can be recycled; are hydrophilic with high aqueous content (>75% by weight).

In use, the hydrogel particles are be added to a pipeline using existing infrastructure already in place for the injection of inhibitors (thermodynamic or kinetic) into that pipeline. It is envisaged that the injection route for the hydrogels would be via the existing inhibitor injection umbilical fitted to most pipelines. The inhibitor hydrogel particles then swell to a controlled-size by absorbing the free water phase within the hydrocarbon fluid flow. The absorption of the aqueous phase into hydrogel particles dispersed in a liquid hydrocarbon phase remains discrete as separate hydrogel particles. The thermodynamic and/or kinetic hydrate inhibition within the hydrogel particles is then used to inhibit formation of a gas hydrate phase within the pipeline or flowline. However, where gas hydrate is formed, the hydrates tend to form as a surface shell on the hydrogel particles and grow inward. The gas hydrate therefore remains discrete in the pipeline on the separated hydrogel particles.

It should be appreciated that inhibitor (kinetic and/or thermodynamic) concentration in the hydrogel can be controlled. Thus, depending on the company's strategy, a hydrate shell may be used or not while transporting the hydrogels.

Depending on the field location and available infrastructure, an optimized gas hydrate management strategy can be developed using the hydrogels as a versatile base. In some embodiments, the anti-agglomeration performance of hydrogel particles can be used as the basic management strategy, with a kinetic inhibitor incorporated into the hydrogel for the fields with relatively less subcooling condition and short travel duration of fluids. For applications with high subcooling and long transformation duration, such as long distance tieback for deep-water gas fields, the gas hydrate can include a thermodynamic hydrate inhibitor. The concentration of thermodynamic hydrate inhibitor can be lower than the value required to fully prevent hydrate formation, and the practice is known as under-inhibition. Such an under-inhibition concept can be coupled with hydrogel to minimize the infrastructure for THI as well as to manage the hydrate blockage risks for both steady-state and transient operations.

Once the hydrogel particles arrives at the end of the pipeline (for example a platform), the particles can be separated by filtration or other suitable particle separation method such as but not limited to of centrifugation, ultracentrifugation, filtration, ultra-filtration, sedimentation, flocculation, and combinations thereof. It is noted that the fine water droplets in the liquid phase may be difficult to separate, so a number of techniques may be needed to achieve separation. However, once all the free water is formed into controlled-sized particles, separation can be more easily achieved.

Thereafter, the hydrogel is sent to a polymer recovery unit where the polymer will be recovered using a solvent and will can be reused again to form further polymer hydrogels. The released free water is typically transferred to water treatment unit for further processing. In some embodiments, the salt ions in the free water might be separated along with the polymer, which assists the MEG regeneration process.

The inhibitor (for example MEG) from the hydrogel particles is also recovered and then recycled using conventional regeneration processes, for example MEG re-concentration and reclamation processes well known in the art, such as the Pure MEG process. In the case of KHIs they can be included during the synthesis of the hydrogel so they are physically mixed within the hydrogel network so are easily recycled with the hydrogel. Advantageously, the presence of the hydrogel does not adversely affect the MEG regeneration temperature indicating that the intereactions of the MEG with the polymer are not too strong as to increase the temperature of regeneration.

The gas hydrate inhibitor of the present invention is formed by the cross-linked polymer particles of a polymer hydrogel, for example CMC-PAM-co-AA, being swelled by mixing in an aqueous inhibitor solution (for example a MEG solution or KHI solution), thereby forming hydrogel particles containing that inhibitor absorbed within the aqueous content of the hydrogel. A variety of inhibitors can be used. For example, the inhibitor can be a thermodynamic hydrate inhibitor such as methanol, mono-ethylene glycol (MEG), diethylene glycol (DEG) or a kinetic hydrate inhibitor such as homo- and co-polymers of the N-vinyl pyrrolidone and N-vinyl caprolactam, for example Polyvinylcaprolactam, Vinylpyrrolidone, or Vinylcaprolactam. Other similar inhibitors can also be included in the hydrate structure as known in the art, and it should be understood that the present invention should not be limited to the above listed inhibitors.

In some embodiments, the inhibitor content is absorbed into the polymer hydrogel using the aqueous absorption properties of the hydrogel.

The inhibitor concentration/content can be varied by changing the concentration of the inhibitor within the aqueous inhibitor solution the hydrogel is immersed for the swelling process and the time that polymer hydrogel is immersed in that aqueous solution. This method is particularly suitable for the inclusion of THIs into the hydrate. The thermodynamic inhibitor concentration in that aqueous inhibitor solution can therefore vary from between 5 to 80 wt %, in some case between 5 to 50 wt % depending on the requisite concentration desired in the final inhibited hydrogel particle.

Alternatively the inhibitor can be included (for example physically mixed) with the polymer during hydrogel synthesis. The inhibitor is therefore incorporated into the hydrogel during synthesis as an additive. This method is particularly suitable for the inclusion of KHIs into the hydrogel. In the case of KHIs they can be included during the synthesis of the hydrogel so they are physically mixed within the hydrogel network. The concentration of the KHI can be 0.01 to 10 wt %. Here, the inhibitor concentration/content can be varied by varying the concentration of the inhibitor included in the hydrogel during synthesis.

In other embodiments, the inhibitor is included in the cross-linked polymer structure of the hydrogel. For example, in some embodiments the structure of the hydrogel includes and more preferable comprises a KHI. Suitable KHI structures include homo and/or copolymers of at least one of VinylCaprolactam, N-isopropylacrylamide or VinylPyrrolidone. Again, the inhibitor concentration/content can be varied by varying the concentration of the inhibitor included in the hydrogel during synthesis. In some embodiments, the polymer structure of the hydrogel comprises a KHI.

The hydrogels used in the present invention are preferably formed using a method of suspension polymerisation which cross-links and/or functionalises water soluble polymers to generate structurally diverse aqueous cross-linked gels, functionalized polymers, or hydrogel beads. The term "suspension polymerisation" is generally used herein to refer to both the suspension polymerisation process, and the inverse-suspension polymerisation process, unless indicated otherwise.

Suspension polymerisation consists of the polymerisation of small monomer droplets suspended in a medium, which is usually water in the case of normal suspension polymerisation. The medium can also be an organic compound in the case of inverse-suspension polymerisation. In suspension polymerisation, a solution is formed that comprises a monomer unit that is insoluble in the medium, and an initiator that is dissolved within the monomer. The solution is mixed and polymerisation is induced. This results in the formation of small polymer beads typically in the size range of several microns to several millimetres. The size of the beads is generally dependent on the physical and chemical parameters of the reaction environment. Such parameters may include: stirring speed, volume ratio of medium to monomer, concentration and type of stabilisers used, or viscosities of respective phases etc.

As discussed above, the method of suspension polymerisation is for forming polymers from monomers. However, the inventors have found that the method of suspension polymerisation can be adapted and used for the cross-linking of polymers. In this adapted suspension process, polymers are used instead of monomers. This process of polymer cross-linking and functionalisation requires no polymerisation step. This approach has been found to generate cross-linked materials that are more controlled in terms of both the morphology and functionality and offer advantages in terms of chemical stability.

Polymers that are suitable for use in the inverse-suspension process include any hydrophilic polymers that contain functional groups that can bond with cross-linking agents. However, it has been found that polymers containing carboxyl groups are particularly useful as they can be activated to readily react with target agents. Without limiting the scope of the invention, suitable polymers include: polyacrylic acid, polyacrylamide, copolymers of polyacrylamide including hydrolyzed polyacrylamide or polyacrylamide-co-acrylic acid, polyacrylamide-co-acrylic acid partial sodium salt, poly(acrylic acid-co-maleic acid), cationic polyacrylamides, anionic polyacrylamides, and amphoteric polyacrylamides.

The polymer is activated in aqueous solution by reacting with a molecule. By way of example, in the case of a polymer containing a carboxyl group a molecule that reacts and forms a covalent bond with the carboxyl group is added, this results in the formation of an activated carboxylate group.

Amide bonds are typically synthesized from the reaction of carboxylic acids and amines; however, this reaction does not occur spontaneously at ambient temperature, with the necessary elimination of water only taking place at high temperatures (e.g. >200° C.) conditions typically detrimental to the integrity of the components. For this reason, it is usually necessary to first activate the carboxylic acid, a process that usually takes place by converting the —OH of the acid into a good leaving group prior to treatment with the amine by use of a coupling agent such as carbodiimides, 1H-benzotriazole, and reagents generating acid halides (eg., cyanuric chloride).

In one aspect, a compound such as carbodiimide is added to react with the carboxyl group to form an activated carboxylate group. This can then be followed by a further reaction with a compound such as a succinimide to form a succinimide ester derivative. The resulting polymer containing a succinimide ester derivative group can then be cross-linked using a range of different polyamine compounds to form a polymer gel structure. The polyamines can be difunctional, trifunctional, tetrafunctional or combinations thereof. The polyamines can also consist of a polymeric compound containing amine groups. Physical parameters such as the rigidity or the cross-link density of the resulting gels can be controlled by changing the structure of the cross-linking agent or by changing the degree of activation of the polymer.

In a variation of this aspect, the resulting polymer containing a succinimide ester derivative group can be reacted with a range of functional molecules, such as monoamines, to provide a functionalised polymer. The functional monoamines can be hydrophilic, hydrophobic, or can contain various functional groups, provided those functional groups do not further interact with other functional groups that may be present on the polymer or on the functional amine molecule itself. The polymers formed via this mechanism can be polymers or copolymers containing multiple chemical moieties on the polymer backbone, for example the polymers or copolymers may contain two different moieties on the backbone or may be terpolymers consisting of three different moieties. By way of example, the incorporation of monoamines which are hydrophobic in nature, into the polymer results in a polymer that is a hydrophobically modified polymer. Conversely, the incorporation of monoamines which are hydrophilic in nature, into the polymer results in a polymer that is a hydrophilically modified polymer. Similarly, the ionic nature of the polymer can also be controlled through the incorporation of monoamine molecules that include various functional groups. The ionic nature of the modified polymer can be anionic, cationic, non-ionic or amphoteric. The degree of functionalisation of the polymers can be readily controlled by changing the level of activation of the polymer. In addition, diamines and polyamines as listed below can be used for functionalising the polymers by using an excess of these amines to ensure functionalisation and not cross-linking (e.g., molar ratio of activated groups to diamine molecules is greater than or equal to 1).

In a further variation of this aspect, the resulting polymer containing a succinimide ester derivative group can be both cross-linked and functionalised as described above to form a functionalised cross-linked gel. Similarly, as above the degree of functionalisation of the gel can be readily controlled by changing the level of activation of the polymer.

The term "carbodiimide" is used in its broadest sense to refer to any compound that contains the functional group RN=C=NR, where R represents any suitable substituent. A non-limiting disclosure of suitable carbodiimides include: 1-Ethyl-3-(3-dimethylaminopropyl)carbodiimide hydrochloride (EDC), 1-[3-(Dimethylamino)propyl]-3-ethylcarbodiimide methiodide (EDC-methiodide), N-Cyclohexyl-N'-(2-morpholinoethyl)carbodiimide (CMC), 1-tert-Butyl-3-ethylcarbodiimide, metho-p-toluenesulfonate, N,N'-Di-tert-butylcarbodiimide, Dicyclohexylcarbodiimide (DCC), N,N'-Diisopropylcarbodiimide (DIC), N-(3-Dimethylaminopropyl)-N'-ethylcarbodiimide, 1,3-Di-p-tolylcarbodiimide, phenyl ethyl carbodiimide (PEC), and phenyl isopropyl carbodiimide (PIC). Generally water soluble carbodiimides are required. However, carbodiimides that can be dissolved in a suitable solvent that is miscible with water may also be used.

The term "succinimide" is used in its broadest sense to refer to any compound containing the succinimide group. A non-limiting disclosure of suitable succinimides include: N-hydroxysuccinimide and N-hydroxylsulfosuccinimide. Alternatively additives such as 1-hydroxy-1H-benzotriazole (HOBt), 1-hydroxy-7-azabenzotriazole (HOAt), and copper (II) complexes with HOAt or HOBt can also be utilized.

The term "amine" is used in its broadest sense to refer to functional groups that comprise a nitrogen molecule with a lone pair of electrons. The amine may be a primary, secondary or tertiary amine. The terms "primary amine", "secondary amine", and "tertiary amine" are well understood by those skilled in the art and refer to amine groups wherein a number of the hydrogen atoms have been replaced with other substituents.

The term "carboxyl group" is used in its broadest sense to generally refer to the carboxylate anion, RCOO⁻, where R represents the attachment to the polymer backbone. The carboxyl group may be in the form of a carboxylic acid or a salt of carboxylic acid.

The term "carboxylate group" is used in its broadest sense to generally refer to esters of carboxylic acid, where the esters have the general formula RCOOR', wherein R represents the attachment to the polymer backbone and R' represent any suitable substituent.

The term "monoamine" is used in its broadest sense to generally refer to any compound comprising a single amine group, where the monoamine has the general formula $RNH_2$ and R is any suitable substituent that can be either hydrophilic or hydrophobic. A non-limiting disclosure of suitable monoamines include: $C_2$ to $C_{20}$ straight chain and isomers of alkyl monoamines methylamine, ethylamine, propylamine, isopropylamine, butylamine, octylamine, 2-amino-6-methylheptane, 2-ethyl-1-hexylamine, tert-octylamine, 2-amino-5-methylhexane, heptylamine, 2-aminoheptane, nonylamine, 2-amino-5-methylhexane, nonylamine, decylamine, undecylamine cycloheptylamine, cyclohexanemethylamine, exo-2-aminonorbornane, 2-ethylcyclohexylamine, cycloheptylamine, cyclohexanemethylamine, cyclooctylamine, 1-adamantanemethylamine, cyclododecylamine, dodecylamine, tridecylamine, tetradecylamine, pentadecylamine, hexadecylamine, octadecylamine, aniline, bromoaniline, 3,4,5-trimethoxyaniline, 2-phenethylamine, 4-propoxyaniline, benzylamine, toluidine, 3-methoxyphenethylamine, anisidine, 2-(trifluoromethyl)benzylamine, 4-aminobiphenyl, 3-Isopropoxypropylamine. 2,4-dichlorophenethylamine, 2-bromophenethylamine, 2-(4-chlorophenyl)ethylamine, 2-ethoxybenzylamine, 2,3-dimethoxybenzylamine, 3,5-dimethoxybenzylamine, 4-(4-bromophenoxy) aniline, 4-aminobenzotrifluoride hydrochloride, and amine functionalized silanes (eg., 3-aminopropyltriethyoxysilane). Other suitable monoamines may include any of the following:

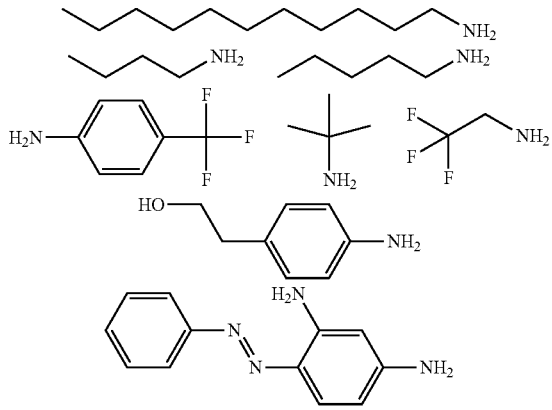

The term "diamine" is used in its broadest sense to generally refer to any compound comprising two pendant amine groups, where the diamine has the general formula $H_2NRNH_2$ and R is any suitable substituent. A non-limiting disclosure of suitable diamines includes: $C_1$-$C_{20}$ diamines, Ethylenediamine, 1,2-diaminopropane, 1,3-diaminopropane, 1,4-diaminobutane, Cadaverine, N-(2-aminoethyl)-1, 3-propanediamine, 2,6-dichloro-p-phenylenediamine, 3,5-dichloro-1,2-diaminobenzene, 4-bromo-1,2-diaminobenzene, 4-chloro-1,3-diaminobenzene, 4-fluoro-1,3-diaminobenzene, phenylenediamine, trans-4-cyclohexene-1,2-diamine dihydrochloride, diaminocyclohexane, hexamethylenediamine, bis(3-aminopropyl)amine, triethylenetetramine, triethylenetetramine hydrate, 2-aminobenzylamine, 4-aminobenzylamine, 1,7-diaminoheptane, 3,3'-diamino-N-methyldipropylamine N,N'-bis(2-aminoethyl)-1,3-propanediamine, 4-(2-aminoethyl)aniline, xylylenediamine, 1,8-diaminooctane, 1,2-bis (3-aminopropylamino)ethane, tetraethylenepentamine, diaminonaphthalene, 1,10-diaminodecane, oxydianiline, 1,12-diaminododecane, 2,7-diaminofluorene, diaminodiphenylmethane, 1,1 binapthyl-2,2 diamine, and 4,4'-ethylenedianiline. Other suitable diamines may include any of the following:

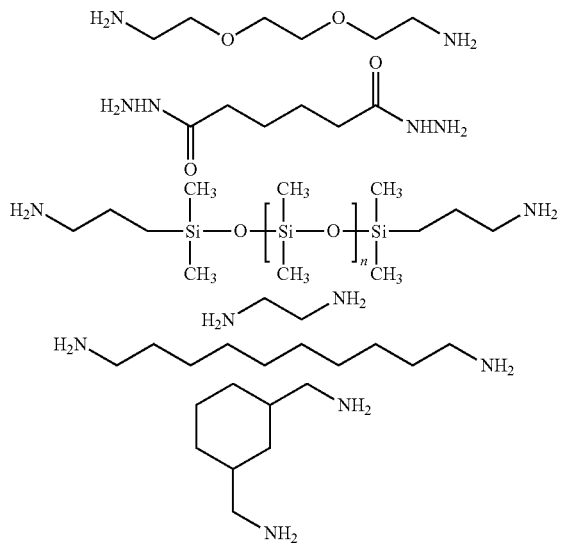

The term "polyamine" is used in its broadest sense to generally refer to any compound comprising at least two amine groups. A non-limiting disclosure of suitable polyamines include: 2-(Aminomethyl)-2-methyl-1,3-propanediamine trihydrochloride, Tris[2-(methylamino)ethyl] amine, 3,3'-Diaminobenzidine, 2,4,6-Triethyl-1,3,5-benzenetrimethanamine trihydrochloride, and Bis(hexamethylene) triamine. Other suitable polyamines may include any of the following:

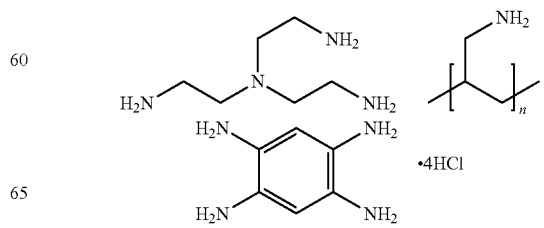

In another aspect a compound such as a cross-linking agent may be added to react with an activated group on the polymer to form a functional group on the polymer.

As above, the functional group on the polymer may be a carboxyl group. The cross-linking agent may be a compound such as a diamine. In this case, one of the amine groups on the diamine reacts with the activated carboxyl group on the polymer to form an amide bond. The amine moiety on the other end of this diamine may react with an activated carboxyl groups on other polymer chains, thus forming a cross-linked polymer.

As stated previously, the suspension polymerisation technique has been adapted to produce the cross-linked or functionalised polymers described by the above aspects of this embodiment. The cross-linking and functionalisation can be carried out in aqueous solutions when the cross-linking agent or functionalising molecule is soluble in water. Alternatively, with increasing hydrophobicity of the cross-linking agent or functionalising molecule, a water-organic solvent system can be used, wherein the organic solvent is miscible with water. A non-limiting disclosure of suitable organic solvents includes: tetrahydrofuran, isomers of propenol, methanol, ethanol, dioxane, dimethylsulfoxide, dimethylformamide, acetonitrile, acetone, acetic acid, or combinations of the above.

After formation of the hydrogel the sample can be freeze dried and ground to form particles that can be reswelled to form hydrogel particles.

Alternatively, the aqueous solution (or the miscible water-organic solvent solution) is suspended in a continuous phase that is immiscible with water with constant agitation. Because the water phase (or miscible water-organic solvent solution phase) is immiscible within the continuous phase, the constant agitation results in the formation of aqueous droplets (or droplets of the miscible water-organic solvent solution) within the immiscible continuous phase. In this case the aqueous phase is the "dispersed phase". A non-limiting disclosure of suitable compounds that are suitable for use as the continuous phase includes toluene and straight chain $C_6$- to $C_8$- hydrocarbons, or combinations of the above.

It will be appreciated that the "dispersed phase" and the "continuous phase" can be any two liquids, provided that they are immiscible in one another. For example, the dispersed phase may be a polar liquid when the continuous phase is a non-polar liquid with which the dispersed phase is immiscible. Alternatively, the dispersed phase may be a non-polar liquid when the continuous phase is a polar liquid with which the dispersed phase is immiscible. FIGS. 1(B), (C) and (D) provide illustrations of two immiscible phases, that when agitated or mixed by stirring, result in one phase being suspended as droplets within the other phase.

A non-ionic surfactant or mixtures ef-thereof may also be dissolved within the continuous phase. The non-ionic surfactant is for the purpose of stabilising the aqueous droplets within the continuous phase. The surfactant also assists in improving the size and size distribution of the droplets. A non-limiting disclosure of suitable non-ionic surfactant includes sorbitan esters, cellulose butyrate acetate, hydroxyethyl cellulose, cellulose diacetate, 1-Oleoyl-rac-glycerol, 2-cyclohexylethyl β-D-maltoside, polyoxyethylene surfactants (Brij® series), cyclohexylmethyl β-D-maltoside, digitonin, ethylene glycol monododecyl ether, ethylene glycol monohexyl ether, ethylene glycol monooctadecyl ether, Genapol® series (polyoxyethylene dodecyl ether), hexaethylene glycol monodecyl ether, IGEPAL® series (Polyoxyethylene isooctylphenyl ether), nonaethylene glycol monododecyl ether, octaethylene glycol monodecyl ether, octaethylene glycol monotetradecyl ether, pentaethylene glycol monodecyl ether, pentaethylene glycol monohexadecyl ether, Pluronics® series [terpolymers of poly(ethylene glycol)-poly(propylene glycol)-poly(ethylene glycol)], polyoxyethylene (20) oleyl ether, polyoxyethylene (20) sorbitan monolaurate solution, TWEEN® series (polyethylene glycol sorbitan monolaurate), Tergitol® series (polyethylene glycol trimethylnonyl ether), and Triton® series (eg., polyethylene glycol p-(1,1,3,3-tetramethylbutyl)-phenyl ether).

In one embodiment, the non-ionic surfactant is suitable for incorporating hydrophobic groups into the cross-linked polymer. This results in the generation of beads that have hydrophobic groups chemically grafted at the surface of the beads. This has been shown to disperse the beads more readily in a hydrocarbon phase.

The activation and cross-linking of the polymer occurs within the droplets of the continuous phase to generate discrete cross-linked polymer beads which can later be isolated by any suitable extraction method, such as filtration.

It should be appreciated, that where a selected size of hydrogel particle or bead is required, and that particle size is not produced within the desired particle size range (and distribution) the polymer can be comminuted to a suitable final size. This can be achieved through typical comminution processes such as grinding and/or ball milling. Size fractions can then be extracted using typical separation techniques such as sieving, centrifugal techniques or the like to obtain the desired particle size distribution.

In addition, the above method also allows for the incorporation of hydrophobic groups onto the surface of the beads thus facilitating dispersion in hydrocarbon phases as encountered in natural gas pipelines.

The above method may be used to synthesise a range of cross-linked polymer beads of controlled physical and chemical properties. Depending on the types of polymers used in the method, the cross-linked polymer product may be a spherical hydrogel particle.

Furthermore, whilst the above hydrogel formation method is described in detail. It should be appreciated that other formation methods can also be used in conjunction with the present invention, and that the present invention should not be so limited. For example, in some embodiments, the hydrogels are formed from monomers which are cross-linked using suitable techniques such as free radical chemistry. In some embodiments, hydrogels are formed using post-synthetic cross-linking of existing polymers.

EXAMPLES

In the study provided in the examples, the polymer hydrogel particles were synthesized with MEG solution and KHI solution separately, then their hydrate inhibition performance was tested by measuring the hydrate onset time, initial growth rate, hydrate fraction, and torque changes. The experimental scope was extended for MEG and KHI solutions without polymer hydrogels to investigate the effect of adding polymer hydrogels in those solutions.

The results suggest the polymer hydrogel can be utilized as a versatile base material for hydrate inhibitor to be coupled with either thermodynamic hydrate inhibitor or kinetic hydrate inhibitor.

Example 1—Hydrogel with MEG and KHI

Materials

The distilled water used for hydrate experiments was purchased from OCl and decane was from Sigma-Aldrich.

The simulated natural gas (CH$_4$: 90 mol %, C$_2$H$_6$: 6 mol %, C$_3$H$_8$: 3 mol %, and C$_4$H$_{10}$: 1 mol %) was provided by Special gas (Korea).

All of the chemicals for the hydrogel polymer synthesis were purchased from Sigma-Aldrich and were used as received. These chemicals are the following: Polyacrylamide-co-acrylic acid partial sodium salt (PAM-co-AA), Mw 520,000, Mn 150,000, typical acrylamide level 80%; N-(3-dimethylaminopropyl)-N'-ethylcarbodiimide hydrochloride (EDC, commercial grade); N-hydroxysuccinimide (NHS, 98%); and 1,2-diamino ethane (EDA>99%); were used for the hydrogel synthesis. Tris(2-aminoethyl)amine (TREN); technical grade; heptane (HPLC grade, >99.5%).

Hydrogel Particle Synthesis

Hydrogel microspheres were generated in an inverse suspension. EDC (0.3993 g) was dissolved in 0.5 mL of distilled water and added to 5 mL of an aqueous solution of PAM-co-AA (15 w/v %) and the resulting highly viscous solution was mixed. After 3 mins, 0.24 g of NHS dissolved in 0.5 mL of distilled water was added, at this stage the viscosity of the solution decreased. This activated polymer solution was then added drop-wise over a five minute period to 95 mL of heptane containing 5 w/v % Span 60 in a 250 mL round bottom flask heated to 50° C. The solution was continuously stirred at 1000 rpm using a magnetic stir bar (32×16 mm egg shaped) to provoke droplet generation. This mixture was termed an inverse suspension of activated polymer and consisted of an aqueous polymer phase suspended as droplets in heptane. After five minutes the cross-linker (0.063 g EDA), dissolved in 0.5 mL of water, was added drop-wise to the inverse suspension which initiates the reaction. The reaction was complete after only 40 minutes at 50° C. and the resulting hydrogel microspheres were isolated by filtering through a filter funnel that was heated to 60° C. Alternatively, the microspheres were added to excess ethanol (500 mL) and were then filtered.

FIG. 1 illustrates schematically the above process of formation of the hydrogel particles from water swellable polymer networks (FIG. 1A,B) and their conversion into a transportable hydrate slurry (FIG. 1C) that does not agglomerate when the stirring is stopped (FIG. 1D). The dried polymer particles (structure shown in FIG. 1E and microscopy image in FIG. 1F) contact an aqueous phase and swell to a controlled degree to form hydrogel particles. It is worth noting that this is fully reversible, and the particles can be deswollen using a water-miscible solvent that cannot dissolve the polymers (e.g., ethanol).

An alternative to inverse suspension polymerization is to freeze dry hydrogel blocks. The freeze dried resulting porous network can be ground and sieved to form particles. In this case the hydrogel was attached to a freeze dryer in separated glass vials. Total dry and foamed polymers were generated in the glass vials after about 4 hrs in the vacuum condition. These polymers were removed from the vials and ground using mortar and pestal. To assist grinding, dry ice was applied to enhance the brittleness as needed. Fine particles roughly similar size was generated.

For MEG Swollen Hydrogels:

the hydrogel particles containing water were dried by precipitating the polymer in ethanol to remove the water. The resulting dried polymer was swollen in a 20% w/w % solution of MEG and the final polymer concentration was 13%.

For Hydrogels Incorporating KHIs:

Hydrogel blocks can be freeze dried and the resulting porous network can be ground and sieved to form particles. The hydrogel in this case was formed by dissolving EDC (0.3993 g) in 0.5 ml of deionised water and adding this solution to 5 ml of an aqueous solution of PAM-co-AA (15 wt %). The resulting highly viscous solution was mixed and after 3 mins, 0.24 g of NHS dissolved in 0.5 ml deionised water was added. At this stage, the viscosity of the solution decreased and after 3 mins, the requisite crosslinker, dissolved in 1 ml of deionised water, was added to the above solution, and the mixture was shaken. The total volume of hydrogel formed was approximately 15 ml. Luvicap-hydrogel (0.5 wt %) is formed by adding luvicap to the aqueous solution PAM-co-AA (15 wt %) before addition of the EDC, the weight ratio of Luvicap and polymer is 0.5 to 100.

Hydrogel Hydration

The dry hydrogel particles were placed in a glass jar, and sufficient heptane was added to cover the particles with a magnetic stirrer in the jar. Water was added in a dropwise manner while stirring vigorously, whilst ensuring the particles were separated in the jar. Water addition ended when all the particles became transparent. At this stage, the weight ratio of water and particles was approximately 3:1. The heptane was decanted and the gel jar was left open in a fume hood for 3 hrs until the heptane is vaporized completely. At this stage a cluster of bead-like gel were formed.

Hydrate Studies

In this work, a high pressure autoclave equipped with a magnetic stirrer coupling and a four-blade impeller was used to study hydrate formation. This provides information regarding the hydrate onset time, growth rate, hydrate fraction and flowability of fluids by measuring pressure, temperature, and torque changes during hydrate formation. A synthetic natural gas mixture was used in all of the experiments as detailed in the materials section above.

A total liquid volume of 30 mL was loaded into the autoclave cell which had an internal volume of 360 mL. The cell was immersed in a temperature-controlled liquid bath connected to an external refrigerated heater. A platinum resistance thermometer monitored the temperature of the liquid phase inside of the autoclave with an uncertainty of 0.15° C. The pressure was measured by a pressure transducer with an uncertainty of 0.1 bar in a range of 0-200 bar. To provide vigorous mixing of the liquid phase, an anchor type impeller on a solid shaft coupled with the motor (BLDC 90) was used. The impeller was located on the base of the shaft and the stirring rate is maintained at 600 rpm for all experiments. A torque sensor (TRD-10KC) with platinum coated connector measured the torque of continuously rotating shaft with an uncertainty of 0.3%. It used a strain gauge applied to a rotating shaft and a slip ring that provides the power to excite the strain gauge bridge and transfer the torque signal. Temperature, pressure and torque data were recorded using a data acquisition system.

The experiment was commenced by loading the 30 ml of liquid phase into the autoclave cell. After purging the cell three times with the natural gas, the autoclave was pressurized to 120 bar at 24° C. while stirring at 600 rpm to saturate the liquid phase with gas. The Reynolds number at this mixing speed was about 32,000 indicating the fluid is in fully developed turbulent regime. Once the pressure and temperature reached steady-state, the cell was cooled to 4° C. within two hours and kept for 10 hours at the temperature. During this time, torque, pressure and temperature were continuously monitored. Ten experiments were carried out for each system to determine averages for the hydrate onset time, subcooling temperature, and the amount of gas consumed, and to obtain improved statistics regarding any trends in hydrate formation and transportability. The dissociation of hydrate was carried out at 24° C. for three hours to remove the residual hydrate structures.

A total of 30 experiments were carried out for
1. water+decane mixture;
2. 20 wt % MEG solution+decane mixture; and
3. 0.5 wt % Luvicap solution+decane mixture.

Another 30 experiments were performed to investigate the effects of polymer hydrogels on hydrate inhibition across three systems of:
1. hydrogel+decane mixture;
2. MEG-hydrogel+decane mixture; and
3. Luvicap-hydrogel+decane mixture.

The watercut was maintained at 60% for all experiments. It should be appreciated that Luvicap range of kinetic inhibitors available from BASF Corporation comprising Polyvinylcaprolactam (VCap) in ethylene glycol (with an active content of 41%) or Vinylpyrrolidone ((VP)/Vinylcaprolactam (Vcap) 1:1 copolymer (with an active content of 50%). In these experiments, Luvicap comprises Polyvinylcaprolactam (VCap) in ethylene glycol (with an active content of 41%).

The experiments with continuous cooling have been widely used to investigate the performance of hydrate inhibitors through measuring the hydrate onset time and resistance-to-flow. The present study also adopted the isochoric continuous cooling method to investigate the effect of polymer hydrogels on the hydrate inhibition performance.

Figure 2:
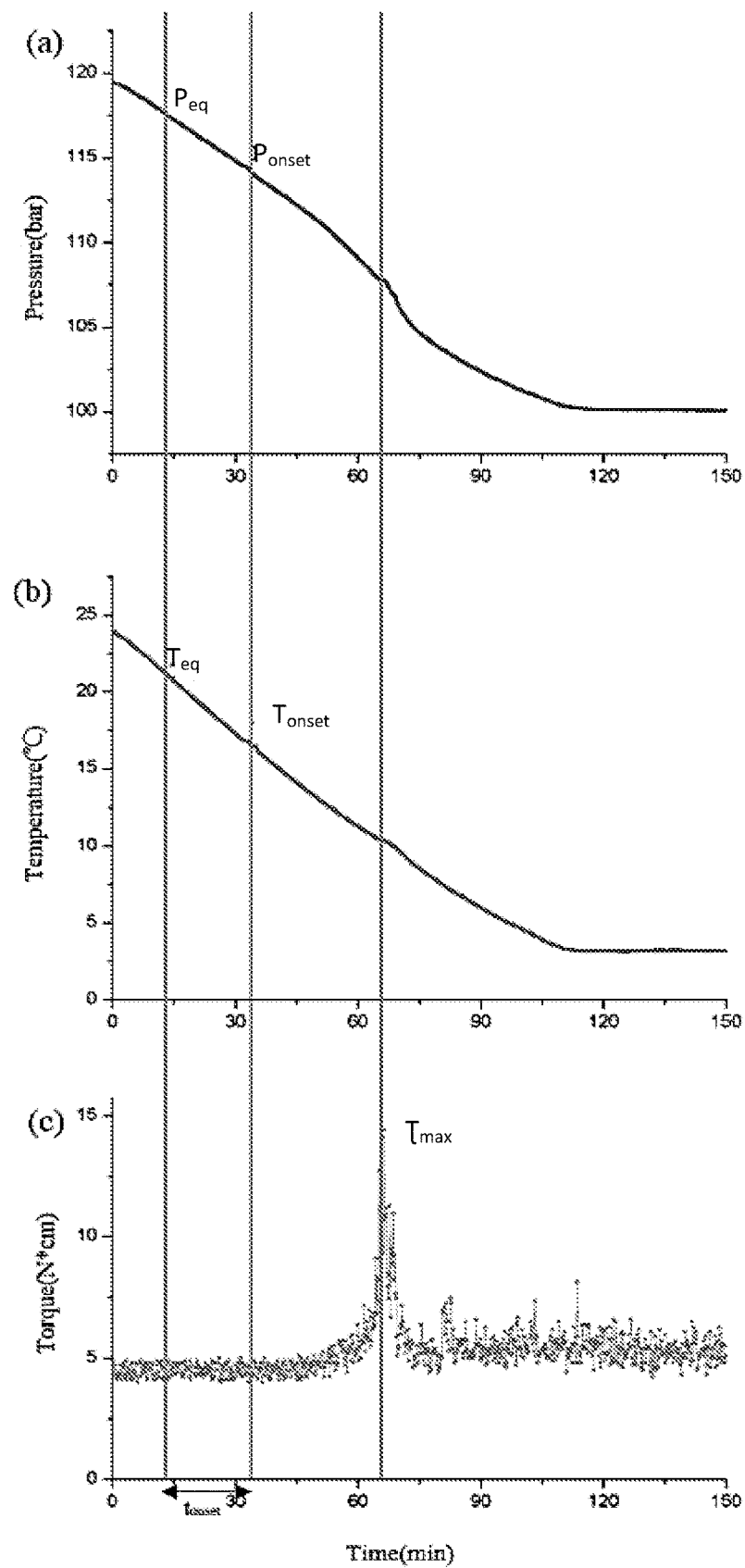
FIG. 2 provides pressure, temperature, torque change during first cooling cycle of water+decane mixture with natural gas. The onset means difference between hydrate equilibrium condition (temperature and pressure) and hydrate formation condition (temperature and pressure).

FIG. 2 shows an example of pressure, temperature, and torque changes during the cooling of water+decane mixture with natural gas from 24 to 4° C. continuously at 600 rpm. Time zero indicates the moment of cooling process. Hydrate formation can be identified at about 34 min since the cooling process by a temperature kick and change of pressure decrease trend, FIGS. 2 (a) and (b), which are due to an exothermic formation of gas hydrates consuming gas molecules. As the hydrate particles grow further, the pressure decrease is becoming significant and the torque starts to rise at 58 min, FIG. 2(c), when hydrate particles suspended in liquid phase agglomerate and/or deposit on the wall. As seen in FIG. 2, there is a time difference between the hydrate onset moment and the equilibrium condition, which is presented as $t_{onset}$ indicating how long the hydrate formation is delayed at corresponding system. Similarly the subcooling temperature, $\Delta T_{sub}$, is calculated by the temperature difference between the hydrate onset moment and the equilibrium condition. Hydrate fraction in the total liquid phase, $\phi_{hyd}$, is estimated from the decrease of pressure during the hydrate formation using the compressibility factors of natural gas, then water conversion to hydrate, $x_{hyd}$, was calculated from the ratio of consumed water to the amount of water loaded into the cell initially. The impact of segregation and deposition of hydrate particles in liquid phase was assessed from torque changes as a function of time and hydrate fraction.

The consumed gas mol % was calculated from pressure difference between the experimental pressure and the postulated pressure with no hydrate formation. This calculation is known to investigate hydrate formation. Thus, $$\Delta n_{H,t} = \left(\frac{P_{cal}V_{cell}}{zRT}\right)_t - \left(\frac{P_{exp}V_{cell}}{zRT}\right)_t$$

where $\Delta n_{H,t}$ is the consumed gas moles for hydrate formation at a certain time, $P_{cal}$ is the calculation pressure with postulation of no hydrate formation, $P_{exp}$ is the observed pressure, $V_{cell}$ is the volume of gas, z is the compressibility factor value from calculation of the Cubic Plus Association equation of state, R is the ideal gas law constant, and T is the gas temperature. The hydrate fraction in the liquid phase is obtained by calculation of following equation:

$$\Phi_{hyd} = \frac{V_{hyd}}{V_{decane} + V_{hyd} + (V_w - V_{w,conv})}$$

where $\Phi_{hyd}$ is he hydrate volume fraction in the liquid phase, $V_{hyd}$ is the hydrate volume that is calculated from the density of hydrate and molecular weight, $V_w$ is the water volume, and $V_{w,conv}$ is the converted water volume to hydrate. The hydration number 6.5 was used for calculation, which was calculated from cage occupancy of small ($5^{12}$) and large ($5^{12}6^4$) cages of structure II hydrate of pure water and natural gas.

Performance of MEG and KHI in Aqueous Solution Systems

The deposition of hydrate particles increase the resistance-to-flow inside the high pressure autoclave and an increase in the torque required to maintain constant mixing rate occurs. A previous study suggested the highest resistance-to-flow was observed for systems with around 60% watercut, where severe local spikes in the torque were observed. The effect of adding thermodynamic or kinetic hydrate inhibitor on deposition of hydrate particles is considered in this study.

Table 1 presents the mean value and standard deviation over ten repeat trials for hydrate onset time, subcooling temperature, hydrate volume fraction at which torque increased, hydrate volume fraction at the end of the experiment, and water conversion. The torque values at hydrate onset and at the highest peak were presented in Table 1 as well. Kinetic inhibition performance can be assessed with the hydrate onset time and subcooling temperature while the segregation and deposition of hydrate particles are discussed based on hydrate fraction, water conversion, and torque values.

The average hydrate onset time was 20.4 min and the average subcooling temperature was 4.7° C. for water+decane mixture at 60% watercut. Addition of 0.5 wt % Luvicap increased the onset time to 83.8 min as well as the subcooling temperature to 11.6° C., which indicates the nucleation and growth of hydrate crystals was delayed significantly in the presence of Luvicap. The onset time increased to 57 min by adding 20 wt % MEG possibly due to the shift of the hydrate equilibrium condition and reduced thermal driving force for hydrate formation. The subcooling temperature was 8.8° C. These results suggest that the addition of Luvicap and MEG in the aqueous phase affect the nucleation and growth of hydrate phase, resulting increased onset time and subcooling temperature.

TABLE 1

Experimental results for water + decane systems with and without hydrate inhibitor at watercut 60%. The standard deviation of ten repeat trials is shown in brackets for each reported value.

| Systems | $t_{onset}$ (min) | $\Delta T_{sub}$ (° C.) | $\phi_{hyd, tran}$ | $\phi_{hyd, final}$ | $x_{hyd}$ (%) | $T_{onset}$ | $T_{max}$ |
|---|---|---|---|---|---|---|---|
| Water + Decane | 20.4 (2.1) | 4.7 (0.6) | 0.13 | 0.50 (0.04) | 74.0 (3.9) | 4.5 | 13.9 |
| Luvicap 0.5 wt % solution + Decane | 83.8 (5.2) | 11.6 (0.18) | 0.035 | 0.40 (0.06) | 58.9 (9.85) | 9.2 | 10.7 |
| MEG 20 wt % solution + Decane | 57.0 (2.7) | 8.8 (0.6) | 0.035 | 0.28 (0.02) | 40.0 (3.6) | 6.2 | 7.3 |

Figure 3:
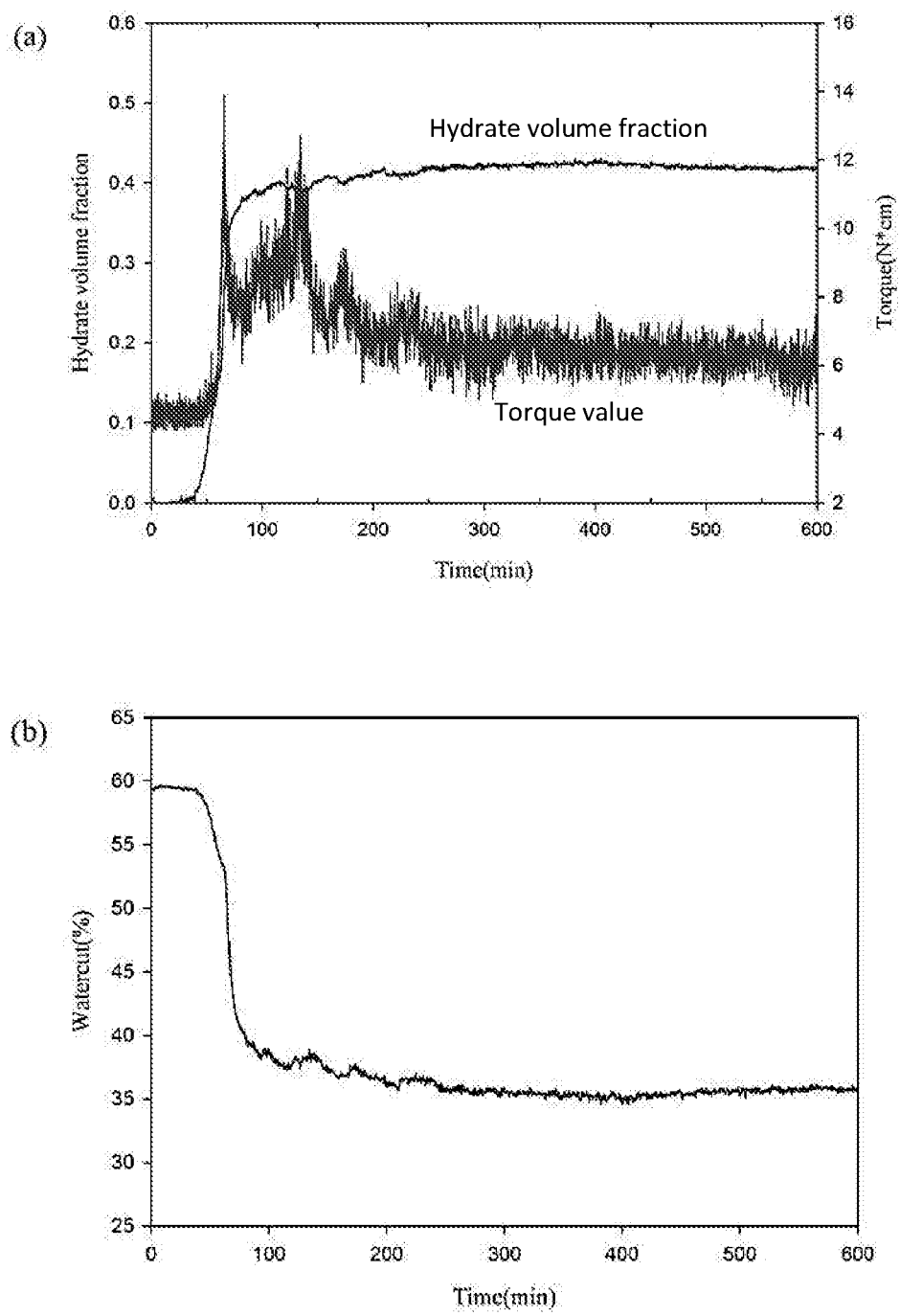
FIG. 3 provides plots of Water+Decane+Natural gas mixture under watercut 60% system illustrating: (a) The change of hydrate fraction and torque during the cycle since hydrate onset; and (b) Watercut trend with time.
Figure 4:
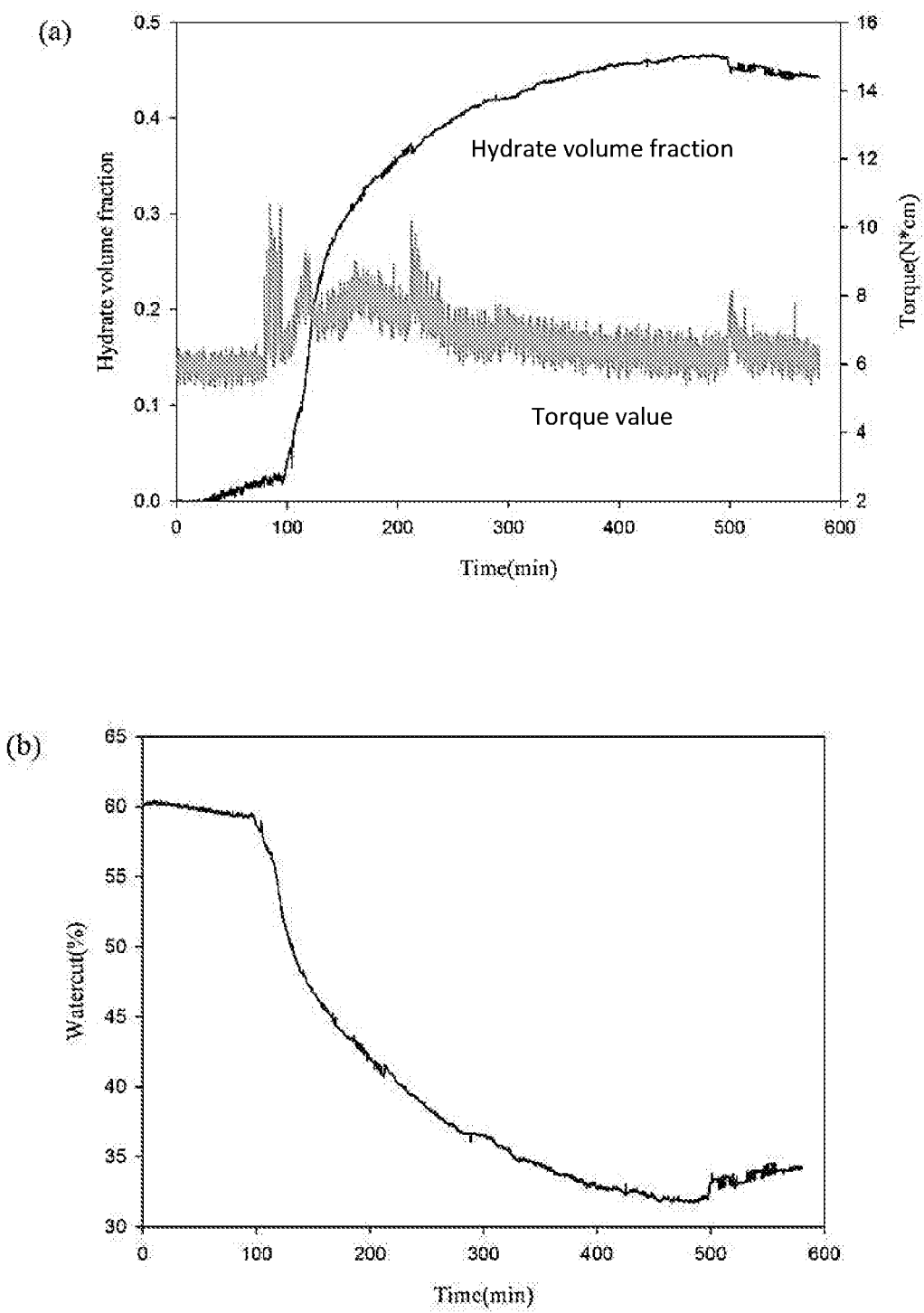
FIG. 4 provides plots for Luvicap 0.5 wt % solution+Decane+Natural gas mixture under watercut 60% system, illustrating: (a) The change of hydrate fraction and torque during the cycle since hydrate onset; and (b) Watercut trend with time.
Figure 5:
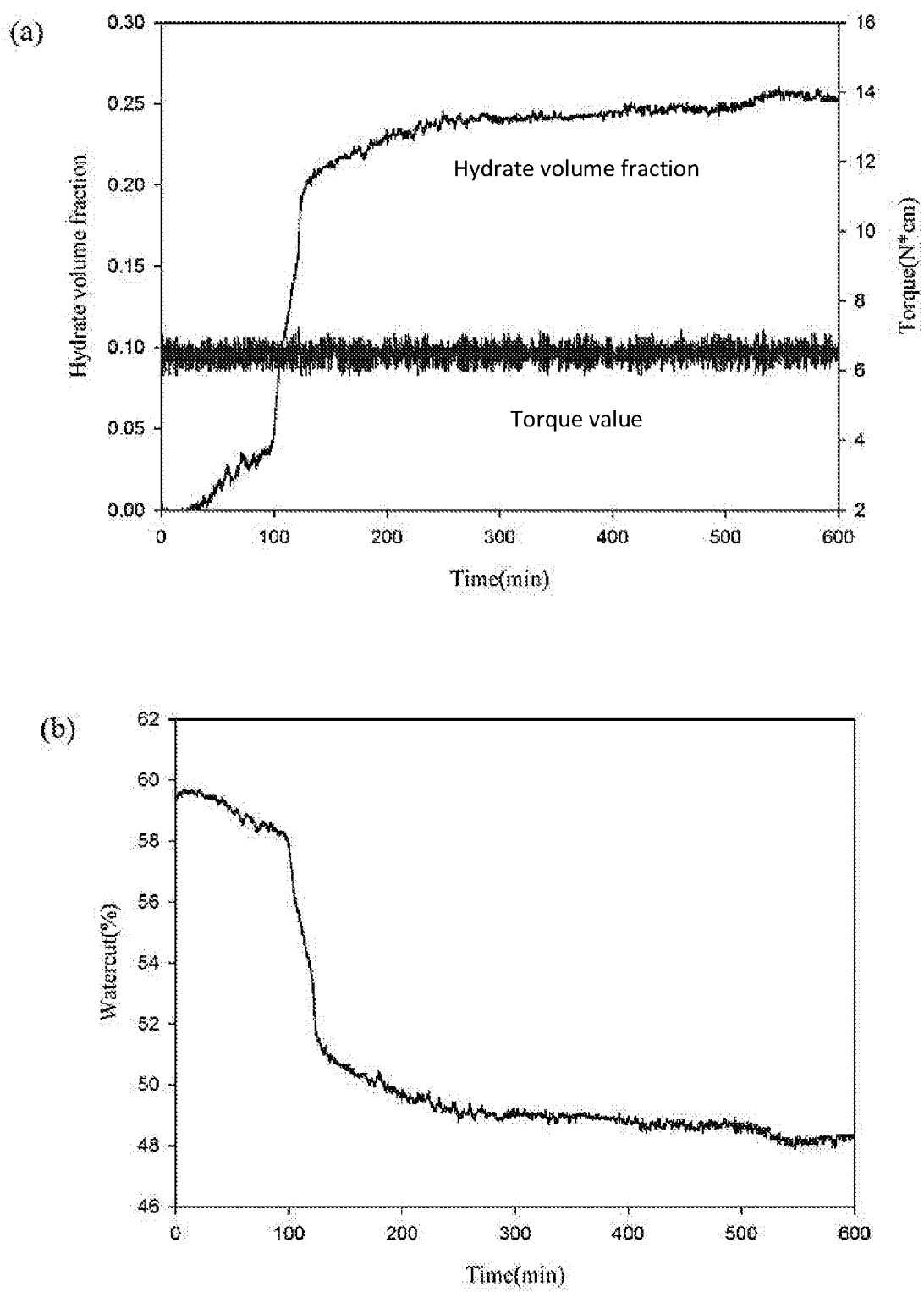
FIG. 5 provides plots for MEG 20 wt % solution+Decane+Natural gas mixture under watercut 60% system illustrating: (a) The change of hydrate fraction and torque during the cycle since hydrate onset; and (b) Watercut trend with time.

Hydrate growth with and without hydrate inhibitors are provided in FIGS. 3 to 5. The torque changes and hydrate fraction data for water+decane mixture are shown in FIG. 3 as a function of time after the onset. There was no distinct increase of torque upon hydrate onset, however when the hydrate fraction reached 13.5% the torque started to rise gradually. It is worth noting that the torque reached a maximum value of 13.9 N cm at water conversion of 33%, then the torque drops sharply to 7.4 N cm while water conversion becomes 54.5% after 50 min since the hydrate onset. The formation of hydrates proceeds to water conversion of 74% in a time of 1000 min, suggesting the most of hydrate formation and growth occurred in initial stage. FIG. 3(b) shows the watercut changed from 60% to 35% when the torque showed a local spike, suggesting the dominant phase may change from water to decane phase by volume due to consumption of water during hydrate formation.

FIG. 4 shows the hydrate fraction and torque change as a function of time after the onset in Luvicap 0.5 wt % solution+decane system. As shown in Table 1 and FIG. 4, the addition of 0.5 wt % Luvicap delays the hydrate onset time significantly and the growth rate in initial stage decreases as well. However water conversion was close to that of water+decane system and the torque rises earlier when the hydrate fraction reaches 0.04. The torque rises gradually leading to the high torque values of 10.5 Ncm with instant maximum value of 10.7 Ncm. The Luvicap is an effective kinetic hydrate inhibitor (KHI) as seen from the delayed hydrate onset time, however it cannot limit the hydrate fraction and the deposition of hydrate particles once hydrate growth proceeds. Previous literatures suggested there might be two stages of hydrate growth in the presence of KHI, which is a slow growth of hydrate and then a catastrophic growth until hydrate plug formation. However, FIG. 4 suggests the similar growth process of hydrates in the presence of KHI to that of water+decane mixture.

The under-inhibition experiment with MEG 20 wt % solution+decane mixture was performed at watercut 60% and the obtained results are shown in Table 1 and FIG. 5. Considering the target temperature of 4° C. and the initial pressure of 120 bar, the MEG concentration needs to be maintained above 43.0 wt % to avoid the hydrate formation completely. The addition of 20 wt % MEG in aqueous phase shifts the hydrate equilibrium curve and reduces the thermal driving force for hydrate formation. The average hydrate onset time was delayed 57 min, which is close to the value obtained by adding 0.5 wt % Luvicap. Moreover, the final hydrate fraction in FIG. 5, 0.28, is also less than that of water+decane and Luvicap 0.5 wt %+decane mixtures. No significant torque change was observed in this work and it is likely soft hydrate particles were formed in the presence of 20 wt % MEG in aqueous phase.

The above results suggested that the hydrate formation in water+decane mixture at watercut 60% accompanied the segregation of hydrate particles from continuous liquid phase and deposition into autoclave wall. The addition of Luvicap 0.5 wt % delayed the hydrate onset time about 4 times longer, however since the hydrate onset its growth and deposition process was similar to that of water+decane mixture. The presence of MEG 20 wt % showed the best inhibition performance, i.e. the significantly delayed hydrate onset time, less hydrate fraction in liquid phase, and stable torque during the hydrate formation. However other literature suggests that the under-inhibited fluid with MEG shows the hydrate deposition and spikes of pressure drop signals although the deposits tend to slough more readily with increasing MEG concentration. It seems the size distribution of hydrate particles and their interaction with liquid phase increases complexity in deposition mechanism of hydrate particles, suggesting better approaches are required for controlling the formation and growth of hydrate particles.

Hydrate Management with Polymer Hydrogels Containing Hydrate Inhibitor

The synthesized polymer hydrogel particles were tested as a hydrate inhibitor using the standard cooling method. Table 2 presents the obtained experimental results.

TABLE 2

Experimental results for hydrogel + decane systems with and without hydrate inhibitor at watercut 60%. The standard deviation of ten repeat trials is shown in brackets for each reported value.

| Systems | $t_{onset}$ (min) | $\Delta T_{sub}$ (° C.) | $\phi_{hyd,tran}$ | $\phi_{hyd,final}$ | $x_{hyd}$ (%) | $T_{onset}$ | $T_{max}$ |
|---|---|---|---|---|---|---|---|
| Hydrogel + Decane | 18.48 (1.87) | 4.4 (0.5) | 0.07 | 0.22 (0.02) | 31.6 (2.4) | 5.49 | 6.37 |
| Luvicap hydrogel (0.5 wt %) + Decane | 58.5 (5.2) | 11 (0.52) | 0.01 | 0.13 (0.01) | 38.7 (2.62) | 5.78 | 7.15 |
| MEG hydrogel (20 wt %) + Decane | 60.0 (17.76) | 8.8 (3.9) | 0.01 | 0.15 (0.03) | 20.9 (4.6) | 4.8 | 5.2 |

The amount of water loaded in the form of hydrogels was determined to make initial watercut 60%. The average hydrate onset time was 18.5 min and the average subcooling temperature was 4.4° C. for hydrogel+decane mixture. Addition of 0.5 wt % Luvicap into hydrogels increased the onset time to 58.5 min as well as the subcooling temperature to 11° C. The hydrate onset was delayed three times longer than without Luvicap, however the KHI performance was slightly less than Luvicap 0.5 wt % solution+decane mixture. The onset time also increased to 60 min by adding 20 wt % MEG into hydrogel, which indicates the KHI performance was less significant for hydrogels containing thermodynamic or kinetic hydrate inhibitors. It seems the initial dispersion of hydrogel particles results high surface area for contacting hydrocarbon phase, thus the nucleation and growth of hydrate can occur on the surface of hydrogel particles with enhanced mass transfer. A comparison of the hydrate onset time and subcooling temperature for hydrogel particles with the solutions indicate the kinetic inhibition performance of Luvicap and MEG was diminished when dispersing the aqueous phase in the form of hydrogel particles. However dramatic differences were observed in hydrate fraction and torque changes.

Figure 6:
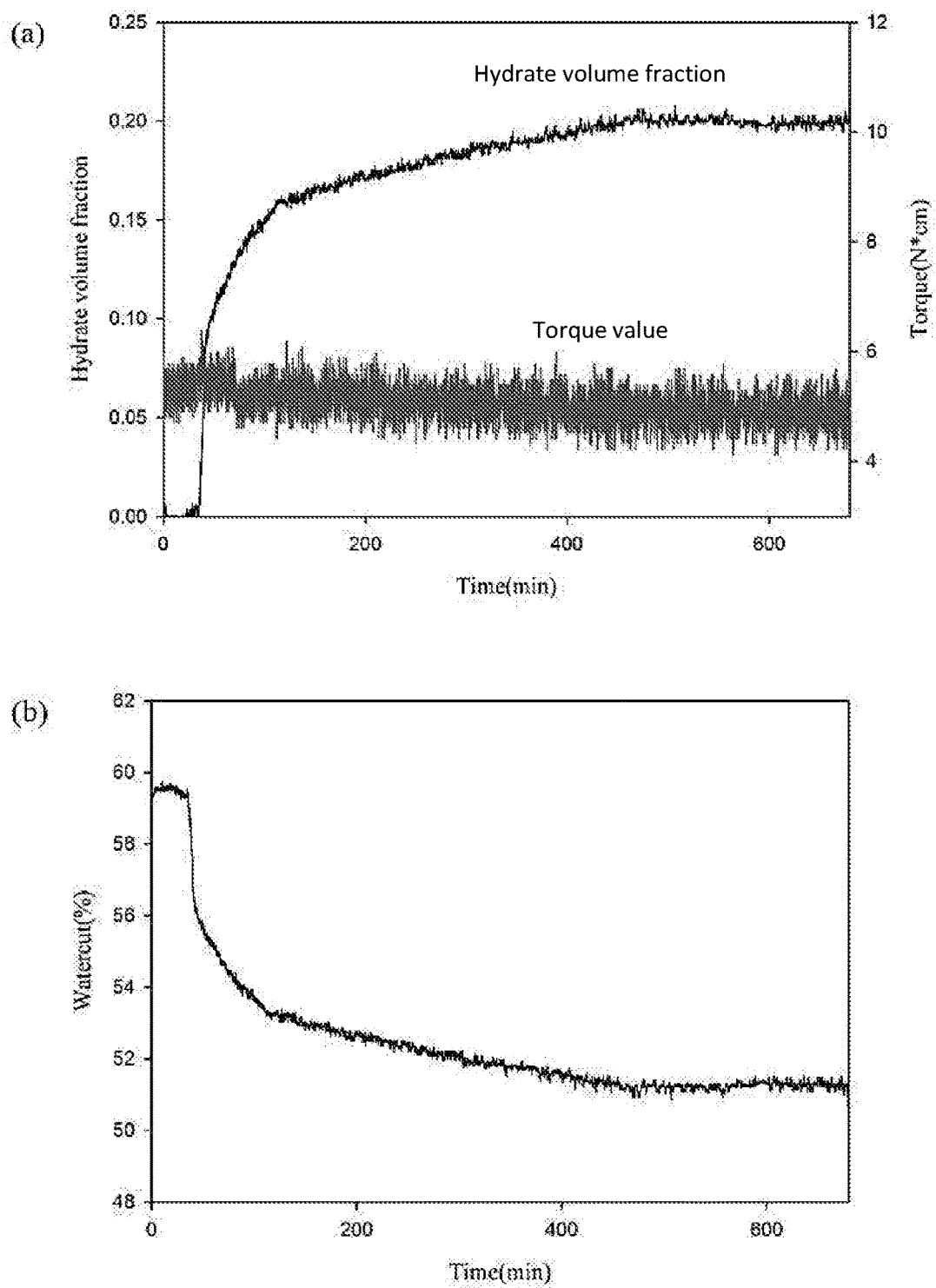
FIG. 6 provides plots for. Hydrogel+Decane+Natural gas mixture under watercut 60% system illustrating (a) The change of hydrate fraction and torque during the cycle since hydrate onset; and (b) Watercut trend with time.

FIG. 6 shows the hydrate fraction and torque changes over time since the hydrate onset in hydrogel+decane mixture. Hydrate fraction reaches 0.22 at the end of experiment, which is much smaller than that of water+decane mixture, 0.50. The volumetric ratio of water to decane was 6:4, thus the hydrogel particles dispersed separately while decane remained between hydrogel particles. Without hydrogel and mixing, there would be clear separation of water from decane phase, however the presence of hydrogel polymer network in aqueous particle enables for them to exist separately. As seen in FIG. 6, hydrate fraction increases faster in early stage of hydrate formation than in water+decane mixture in FIG. 3 as the hydrate formation occurs on the surface of dispersed hydrogel particles. However soon the formation rate became slow only at 10 min since the onset and further reduced at 90 min after the onset. It is likely the hydrate shell is formed on the surface of hydrogel particles, resulting mass transfer limitation during the inward growth of hydrate shell. The hydrate fraction reaches 0.16 at 90 min after the onset and further increase to 0.22 for the rest of 600 min. The torque remained stable during the hydrate onset and growth, suggesting the hydrate shell covered hydrogel particles didn't aggregate or deposit inside autoclave. It is noted that although water was consumed for the hydrate formation of hydrate, hydrogel particles maintain their shape and no severe deposition of the particles were observed. For water+decane mixture, the watercut changed during the formation of hydrate and hydrate particles segregated from liquid phase resulting instant increase of torque. However the hydrate formation was restricted only on the surface of hydrogel particles and there was no clear segregation of hydrate from liquid phase.

Cohesion and sintering of hydrate particles can dominate the formation of hydrate blockages. The cohesion force becomes higher in the presence of aqueous phase between hydrate particles in cyclopentane phase, which enhances the sintering of hydrate particles by inducing formation of hydrate-bridge between particles. However the presence of polymer hydrogel network holds the water molecules inside the hydrogel particle and prevents the outbreak of free water from the particle. The hydrate shell-covered hydrogel particles are likely to become similar to the annealed hydrate particles, where the cohesion force between particles reduces significantly.

Figure 7:
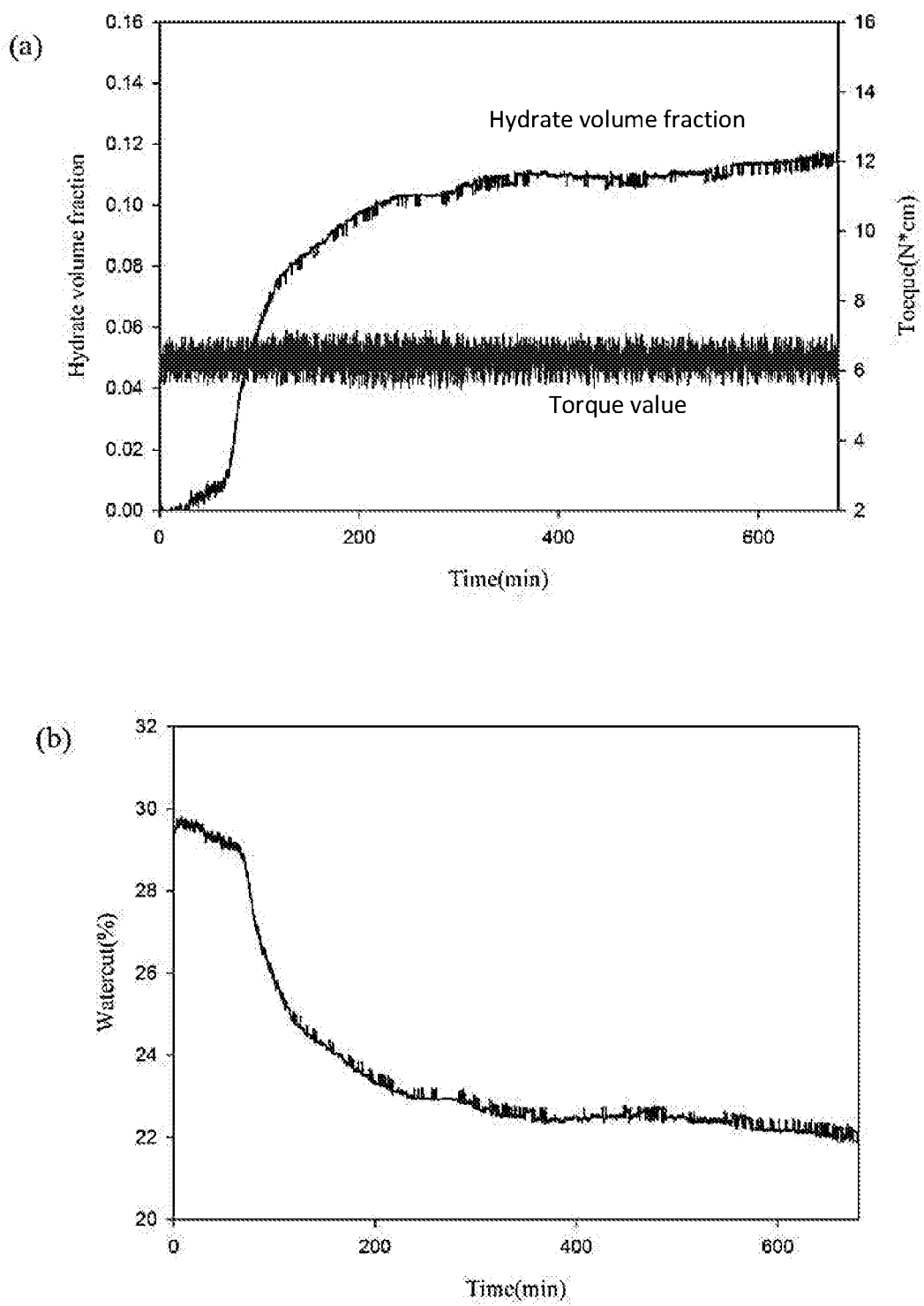
FIG. 7 provides plots for Luvicap hydrogel (0.5 wt %)+Decane+Natural gas mixture under watercut 60% system illustrating: (a) The change of hydrate fraction and torque during the cycle since hydrate onset; and (b) Watercut trend with time.

FIG. 7 shows the hydrate fraction and torque changes over time in Luvicap-hydrogel+decane mixture. The concentration of Luvicap was 0.5 wt %. As discussed in Table 2, the hydrate onset time for Luvicap-hydrogel was delayed three times longer than hydrogel+decane, indicating the Luvicap also played its role as a kinetic hydrate inhibitor even inside hydrogel particle structured with polymer hydrogel network. However, the growth curve of the hydrate fraction in FIG. 7 suggests the initial growth rate of hydrate in Luvicap-hydrogel particle was similar to that in hydrogel particle. The final hydrate fraction for Luvicap-hydrogel, 0.13, was slightly lower than hydrogel, 0.22. Although the hydrate fraction increases readily, it is noted that torque remains stable during the hydrate formation. The torque spike was observed in FIG. 4 for Luvicap 0.5 wt %+decane mixture, however it was not observed in Luvicap-hydrogel+decane mixture. The stable torque clearly suggests the hydrate formation occurs only on the surface of Luvicap-hydrogel and the particles remain separately without bedding or deposition of the particles. The mechanism for avoiding deposition of Luvicap-hydrogel particles is different with the conventional anti-agglomerant as it doesn't involve the chemical surfactant structure. The incorporating Luvicap into hydrogel particles provides the hybrid inhibition performance of both delaying hydrate onset and preventing agglomeration of hydrate particles.

Figure 8:
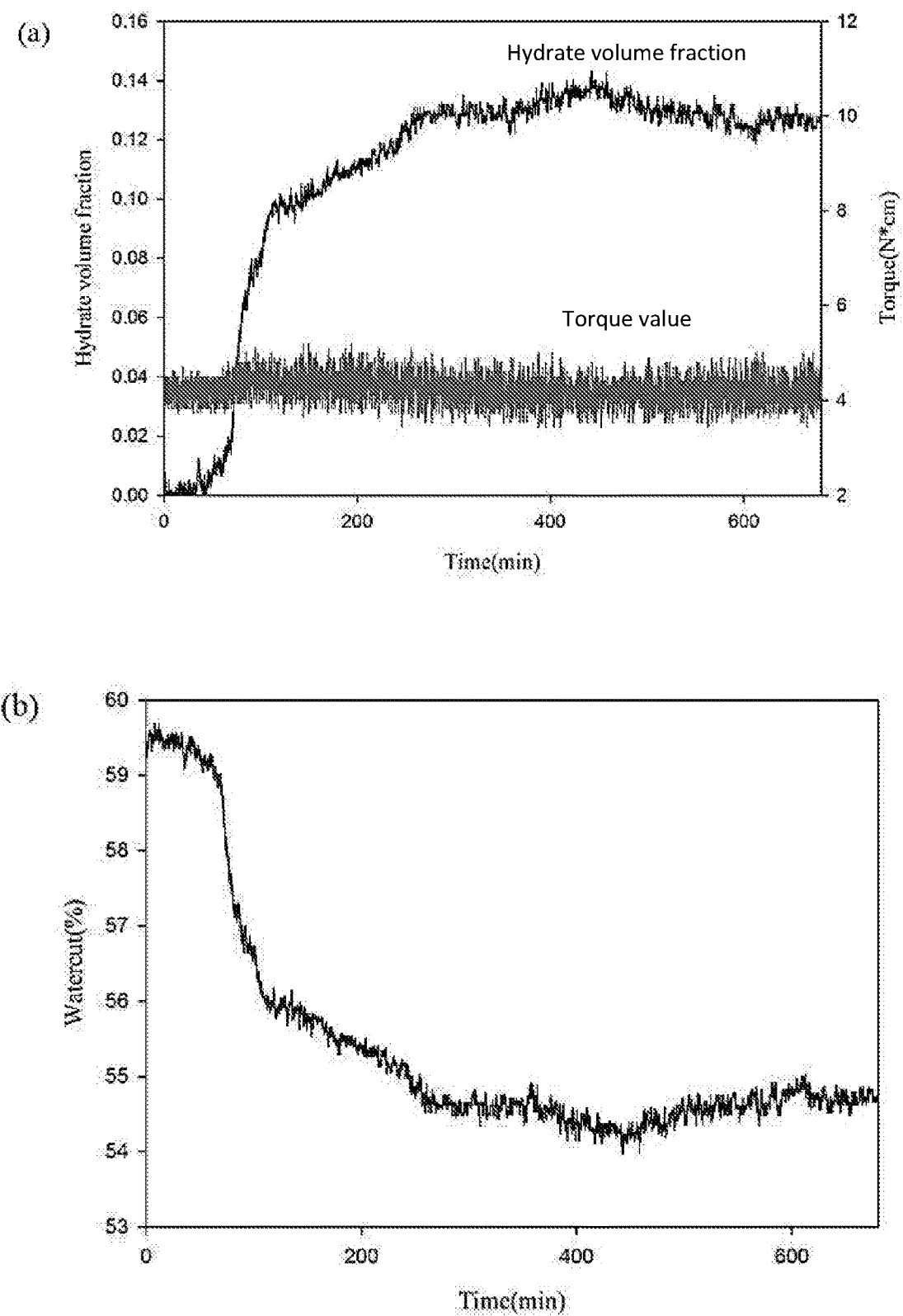
FIG. 8 provide plots for MEG hydrogel (20 wt %)+Decane+Natural gas mixture under watercut 60% system illustrating: (a) The change of hydrate fraction and torque during the cycle since hydrate onset; and (b) Watercut trend with time.

The hydrate formation characteristics in MEG-hydrogel+decane mixture were also studied. FIG. 8 shows the changes of hydrate fraction and torque over time after the onset. When hydrates form in under-inhibition condition, the maximum hydrate fraction in liquid phase can be estimated from the hydrate equilibrium condition with considering the self-inhibition effect. It is noted that the MEG molecules cannot be accommodated into hydrate cages during the hydrate formation, thus the MEG concentration in remaining aqueous phase keeps increasing. If the concentration is sufficient to inhibit the hydrate formation under corresponding pressure and temperature, further hydrate formation would be prevented. From the equilibrium conditions and the P-T trace during the cooling of the MEG-hydrogel+decane system, hydrate formation would cease due to thermodynamic constraint once the MEG concentration in aqueous phase reaches 43.0 wt %. For 20.0 wt % MEG-hydrogel+decane mixture, the theoretical maximum value for water conversion would be 60%, however the Table 2 and FIG. 8 present the water conversion from the experiments varies from A to B, leading to the average water conversion of 21%. Therefore the hydrate fraction was reduced substantially in under-inhibition condition. Considering the total amount of water at the end of experiment, the MEG concentration would increases from 20 wt % to 25 wt %. There might be the distribution of MEG concentration on the surface of MEG-hydrogel particles as the polymer network inside the hydrogel particle may hinder free movement of MEG molecules. During the formation of hydrate shell on the hydrogel surface, MEG molecules would diffuse into the hydrogel core as they were expelled from the growing hydrate structures. Local increase of MEG concentration would reduce the driving force for hydrate formation further, and it ceases in early stage. It is noted that the hydrate fraction in MEG-hydrogel+decane system is less than that of MEG solution+decane mixture, possibly due to the local increase of MEG concentration.

Torque remains stable as seen in FIG. 8 during the entire experiment, indicating the negligible deposition of MEG-hydrogel particles covered with hydrates. As discussed for hydrogel+decane and Luvicap+decane mixtures, the feature of hydrogel particles would be the restricted formation of hydrate shell on the surface of the particles and the solid hydrate phase doesn't segregated from the liquid phase due to the presence of polymer network holding the particle format. Unlike the polymer hydrogels, the formed solid hydrate phase is segregated from the liquid phase and induces bedding and/or deposition with increasing hydrate fraction in the liquid phase. Flow parameters such as flow velocity, watercut, and gas-liquid ratio would affect the conditions of transitioning from the homogeneous dispersion of hydrate particles into the bedding/deposition of the particles. However the addition of polymer hydrogel network in aqueous phase maintains the integration between hydrate shell and hydrogel core particles.

In case of forming hydrate shell in water droplets dispersed in hydrocarbon phase, thick hydrate shell is desirable as thin hydrate shell may fracture upon contacting with other hydrate particles, resulting outbreak of free water from inside and sintering of the two hydrate particles. However for forming hydrate shell in hydrogel particles, the polymer network holds the water inside the particle and minimizes the release of free water into decane phase. After completing the cycles of hydrate formation and dissociation, there was no free water phase released from hydrogel particles, suggesting the synthesized polymer structure was effective to maintain the water inside the network. Previous studies suggested both cohesion and sintering of hydrate particles might be the reason for forming hydrate blockages, however their effect was minimized when forming hydrate in MEG-hydrogel particles.

Figure 9:
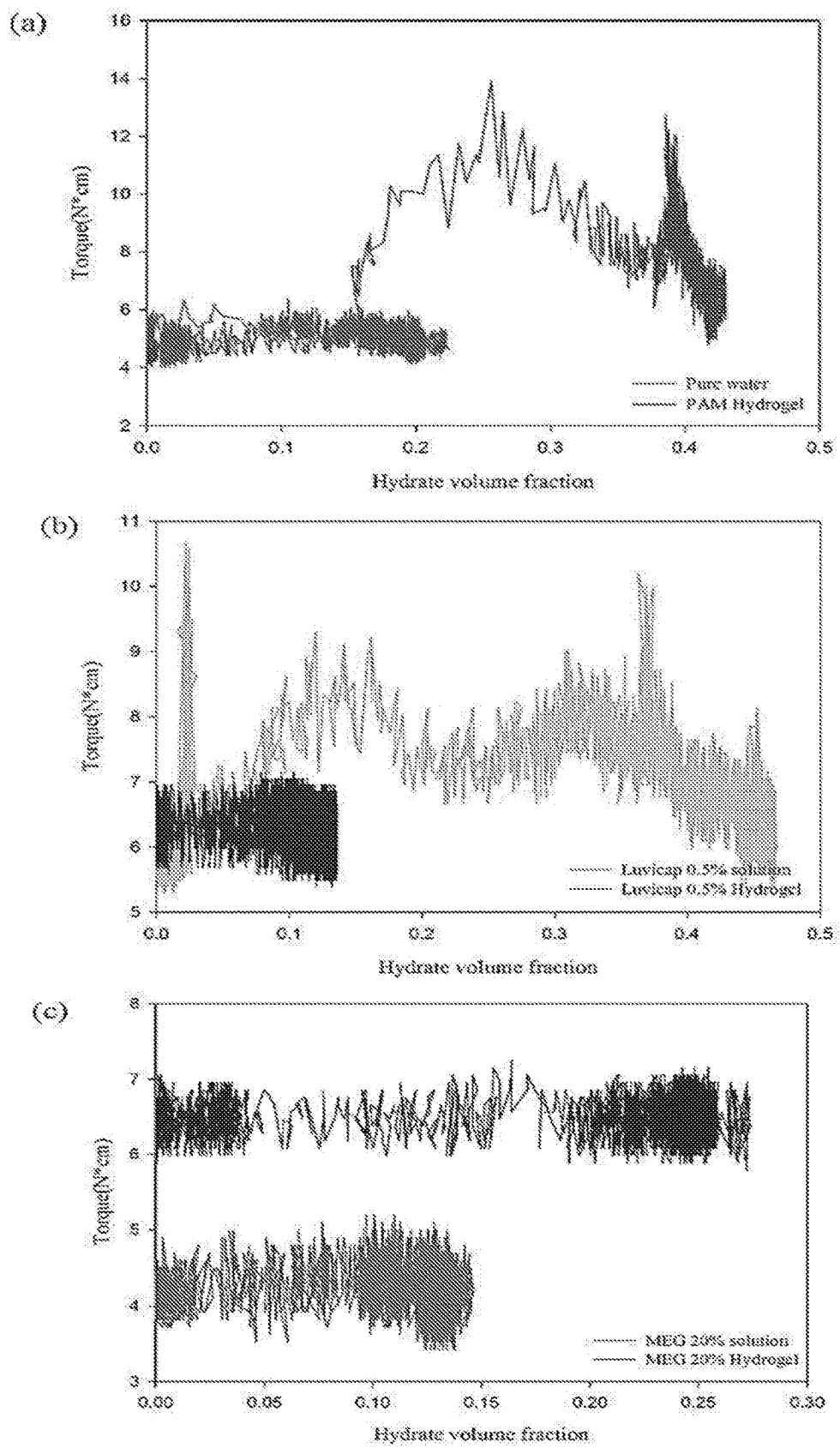
FIG. 9 provides a comparison between the both systems with and without hydrogel, illustrating: (a) water+decane+natural gas mixture and PAM-hydrogel+decane+natural gas mixture (b) Luvicap 0.5 wt % solution+decane+natural gas mixture and Luvicap 0.5 wt % hydrogel+decane+natural gas mixture (c) MEG 20 wt % solution+decane+natural gas mixture and MEG 20 wt % hydrogel+decane+natural gas mixture FIG. 10 provides plots for MEG (20 wt %)-PAM-hydrogel with ethane hydrate on the surface illustrating: (a) Raman spectra and (b) images obtained in a focusing area at 93 K, 153 K, 213 K, and 243 K, respectively. When the temperature was increased, the hydrate shell started to dissociate and no hydrate was observed in the final image at 243K.

FIG. 9 shows torque changes as a function of hydrate fraction during hydrate formation with and without polymer hydrogels in aqueous phase. FIG. 9 (*a*) presents the instant spike of torque in water+decane mixture when hydrate fraction reaches 0.25. Homogeneous distribution of hydrate particles was transformed to heterogeneous segregation from the liquid phase. However the hydrogel+decane mixture shows stable torque until hydrate fraction reaches 0.22 as the polymer network maintains the particle shape even after hydrate formation on the surface of hydrogel particles. This is different mechanism for preventing the agglomeration of hydrate particles from the conventional anti-agglomerant. FIG. 9(b) presents the similar behavior of torque spike in Luvicap 0.5 wt % solution+decane mixture when hydrate fraction reaches 0.035, suggesting the Luvicap has limited capability of suppressing the growth and deposition of hydrate particles in liquid phase. Once again, the torque remains stable when hydrates formed in Luvicap-hydrogel (0.5 wt %)+decane mixture. It is noted that the Luvicap was still active to delay the hydrate onset time significantly and the PAM-co-AA polymer network plays major role to prevent the agglomeration of hydrate particles after the hydrate onset with the mechanism discussed in the above.

The Inventors consider that this is the first work suggesting the hybrid inhibition performance of KHI and AA by incorporating Luvicap with hydrogel particles. There was no adverse effect by dissolving Luvicap in hydrogel particles. FIG. 9(c) presents the torque changes in under-inhibition systems with and without polymer hydrogels. For both cases, torque remains stable during the hydrate formation, suggesting the hydrate particles are likely to be less sticky in the presence of MEG. However adding polymer hydrogels to make MEG-hydrogel can provide the control over the distribution of particle size, thus increasing flexibility for transporting the aqueous phase with hydrocarbon fluid.

The above example study indicates that the synthesized polymer hydrogels prevent the heterogeneous segregation of hydrate from the liquid phase and could be effective as an anti-agglomerant. The decane phase was added in the liquid phase to achieve the watercut 60% initially. Thus the hydrate formation in the mixture of water and decane induces the segregation and deposition of hydrate particles due to cohesion and sintering of hydrate particles in liquid phase. The local maximum torque was observed in water+decane mixture when hydrate fraction reached 0.25. The addition of 0.5 wt % Luvicap in aqueous phase results increase of the average hydrate onset time from 20.4 to 83.8 min, however there were several torque spikes during the hydrate formation suggesting the segregation and deposition of hydrate particles in liquid phase. Instead of Luvicap, the addition of 20 wt % MEG in aqueous phase showed typical behavior of hydrate particles in under-inhibition conditions featuring low hydrate fraction and stable torque during the hydrate formation. However the addition of synthesized hydrogel polymer in aqueous phase presented the anti-agglomeration in all hydrogel+decane, Luvicap-hydrogel+decane, and MEG-hydrogel+decane mixture. It is noted that the water conversion ratio was reduced substantially in the presence of hydrogel, suggesting that the hydrate shell would form on the surface of hydrogel particles and was not segregated from the liquid phase due to the polymer hydrogel networks. For Luvicap-hydrogel+decane mixture, the anti-agglomeration performance of hydrogel particles was coupled with the kinetic inhibition performance of Luvicap. The under-inhibition with MEG was also possible as MEG-hydrogel can be synthesized readily.

Example 2—Hydrogel with MEG

In this study, an aqueous MEG (20 wt %) solution was absorbed into dried polyacrylamide (PAM) hydrogel particles. These spherical PAM-co-AA hydrogels were suspended in a hydrocarbon phase, in this case ethane.

Figure 10:
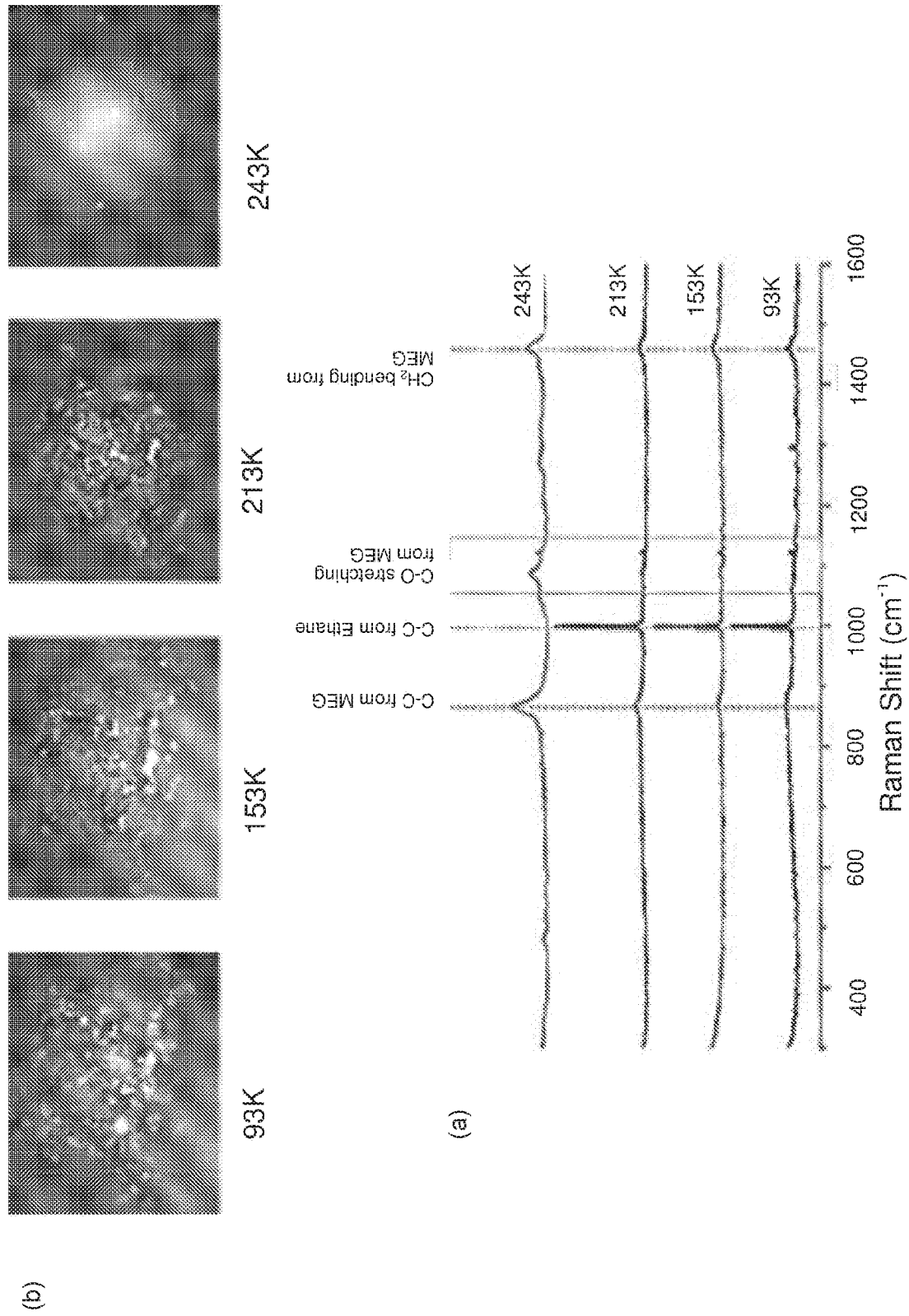

Spherical PAM-co-AA hydrogels were formed using the same method as described in Example 1. After absorbing the aqueous MEG solution the resulting MEG-PAM-hydrogel particles were exposed to ethane at elevated pressure and low temperatures to allow the formation of hydrate. The hydrate formed readily and the hydrogel remained stable. Raman spectroscopy was used and the obtained results indicated that ethane hydrates were formed on the hydrogel particles as shown in FIG. 10.

The image and Raman shift was obtained while increasing the temperature of the hydrogel sample from 93K to 243 K at atmospheric pressure. The images suggested that ethane hydrates on the hydrogel particle gradually dissociated and at 243K the hydrogel returned to its original shape, indicating that the polymer PAM-co-AA still remained in the core where the aqueous phase was maintained. The Raman peak for the C-C stretching bond of ethane hydrate (999 $cm^{-1}$) presents until 213K, but disappears at 243 K. However, the intensity of the Raman peaks associated with MEG (866, 1050-1150, 1459 $cm^{-1}$) increased as the temperature was raised from 93K to 243K.

This is attributed to the formation of a hydrate shell on the surface of the hydrogel particles. The concentration of ethane would be highest at the interface between the gas and the aqueous phase, as the ethane hydrate forms on the surface of the hydrogel particles, the water is extracted from within the hydrogel particle.

Eventually the formation of ethane hydrate ceases due to mass transfer limitations through the ethane hydrate and a separate solid phase remains on the surface of hydrogel particle, i.e. a hydrate shell is formed. The MEG molecules cannot participate in the hydrate structure so they are excluded during the formation process and believed to be concentrated inside the hydrogel core. This is the most likely scenario because the MEG is more soluble in water within the particle than in the surrounding phase. Most of the solid phase observed at 93K is the ethane hydrate while only a small amount of MEG exists as can be seen from the Raman peaks in FIG. 10. By increasing the temperature to 213K, the hydrate structure partially dissociates and MEG migrates back to the surface so there is free water, resulting in a slight increase of the peaks for MEG. It is noted that ethane still remains in the hydrate shell in other areas from the Raman peak for ethane in the large cages of structure I hydrate (999 $cm^{-1}$). However, at 243K the Raman peak for ethane in hydrate cages disappears, indicating that the hydrate shell is completely dissociated and only dissolved MEG remains on the surface of the hydrogel particle. Upon complete dissociation of the hydrate, the MEG solution is absorbed back into the polymer structure again. Overall the MEG-PAM hydrogel shows reversible behaviour in a hydrophobic environment during hydrate formation and dissociation.

Figure 11:
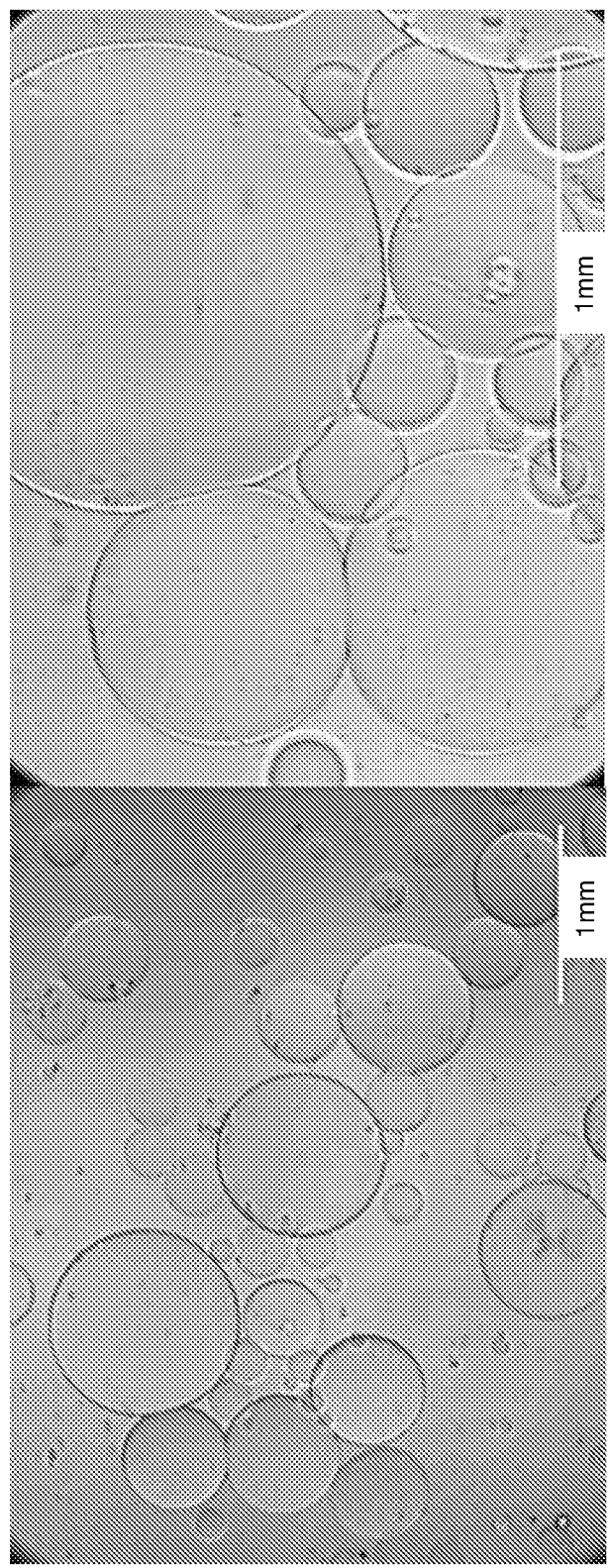
FIG. 11 Microscopy images of MEG-PAM hydrogels after hydrate formation. Despite hydrate formation and dissociation, the shape of the hydrogels remains intact.

This reversible behaviour of the MEG-PAM hydrogels was confirmed using microscopy by comparing the images of hydrogel before and after hydrate formation shown in FIG. 11. Overall the image shows that the MEG-PAM hydrogel stability is not affected by forming and dissociating the hydrate shell on the surface. This is different with the formation of hydrate shell on dry water particles as free water evolves into a separate phase upon dissociation of hydrates, suggesting destabilization of the particle.

This directly evidences the formation of a hydrate shell on the surface of hydrogel particles incorporating MEG. It is suggested that hydrate shell grows at the water-hydrocarbon interface which may induce the agglomeration of the water droplets.

Therefore hydrate formation and dissociation was studied for the hydrogel particles including the onset time, subcooling temperature, hydrate fraction, and torque changes all of which were compared to bulk water (without hydrogel). The hydrate volume fraction in the presence of hydrogel particles were calculated based on the gas consumption whilst monitoring the torque value on an overhead stirrer during hydrate formation and dissociation.

In the case of the MEG-PAM-hydrogel sample, 18 vol. % water in the original system converted to a hydrate (hydrate volume fraction: 0.20); on the other hand, 74 vol. % water conversion occurred in pure water without the hydrogel system (hydrate volume fraction: 0.77). The concentration of MEG in the hydrogel particles would increase to 23 wt % due to loss of water into hydrate shell, suggesting that the concentration of MEG inside the hydrogel particles increases which would limit the hydrate growth inward i.e. self-inhibition in the hydrogel particles.

It was observed that in case of bulk water and a decane mixture the torque value peaks from 5 N cm to max. ~15 N cm upon formation of hydrate, this value then fluctuates with increasing hydrate fraction in every cycle of hydrate formation and dissociation over 10 cycles. This indicates that the initial hydrate nucleation and growth behave as obstacles which induce the observed increase in torque. However, this effect is short lived and occurs only in the first cycle of the MEG-PAM-hydrogels and the torque remains stable for additional cycles. This is attributed to the modified surface, and clearly reveals a different phenomenon compare to the bulk water and decane mixture.

These results suggest that the hydrate shell formation changes the mechanical properties of the particles, which in turn prevents the hydrate from agglomerating. In the case of an offshore flowline the formation of a hydrate shell on the surface of water droplets dispersed in a hydrocarbon phase results in agglomeration of the droplets and hydrate blockages. However, the formation of a hydrate shell on the surface of MEG-PAM-hydrogel did not induce an increase in torque, suggesting the particles are well dispersed in the hydrocarbon phase preventing agglomeration of hydrate particles. In addition, a steady increase in hydrate fraction continued so the fraction reaches around 0.20 that is lower than that of bulk water.

Figure 12:
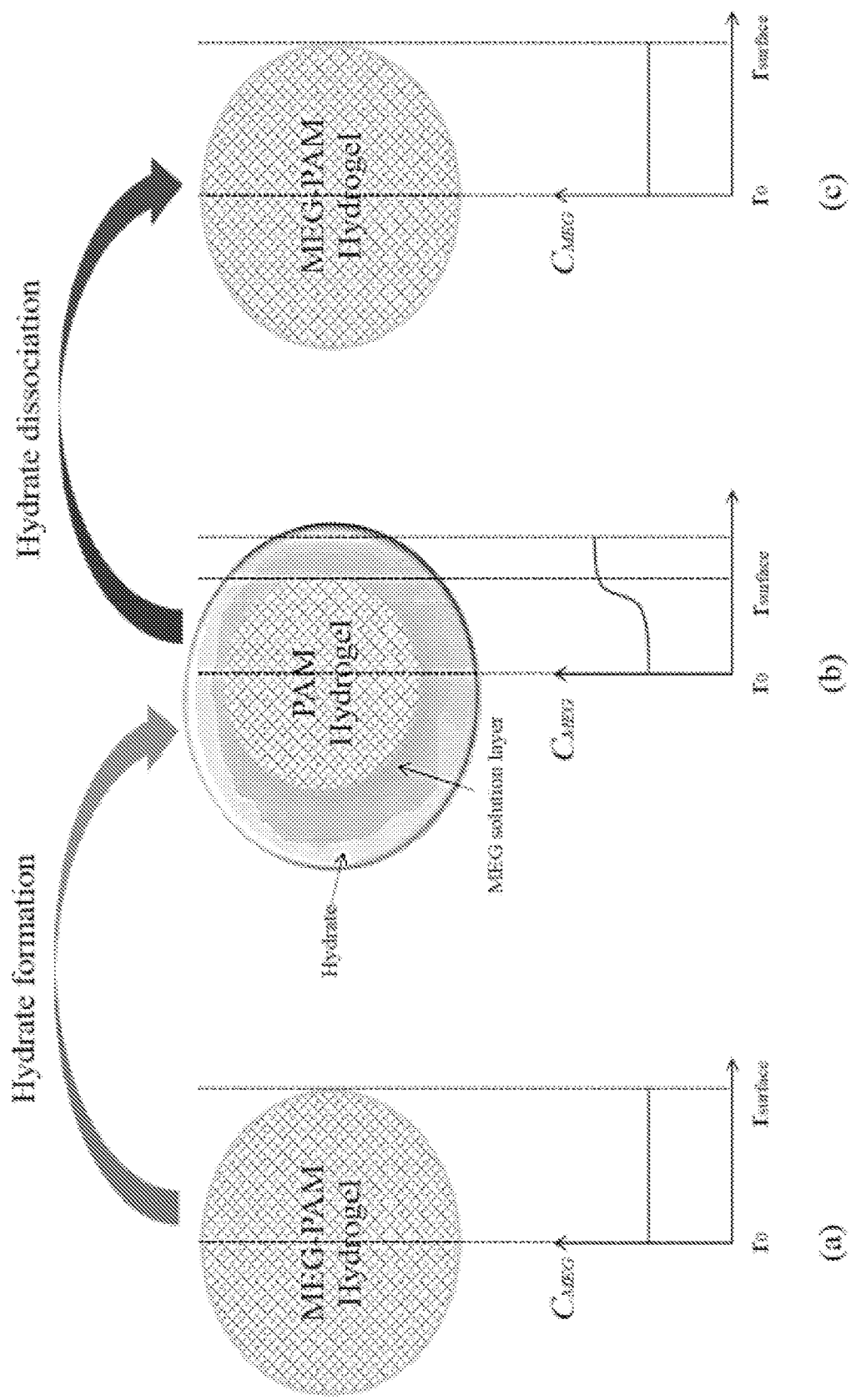
FIG. 12 provides a schematic illustration of hydrate shell formation on the surface of a MEG-PAM hydrogel particle, where $r_0$: polymer core, $r_{surface}$: radius between $r_0$ and polymer surface, $C_{MEG}$: MEG concentration. MEG concentration on the surface would change during the formation and dissociation of hydrate shell.

This phenomenon can be used to develop a novel surfactant-free approach of preventing hydrate agglomeration. The MEG-PAM-particles combine a thermodynamic inhibitor (MEG) with polymer groups (hydrogel) and assemble them into a particulate format. Approaches of this type are known as synergistic hydrate inhibition, and the outlined study is the first example of a single material that combines polymer groups and a THI in a particle format. The reversible behaviour observed for the hydrate formation and dissociation in the hydrogel particles is shown schematically in FIG. 12. Initially the MEG solution is absorbed into a spherical PAM-co-AA particle, forming MEG-PAM-hydrogel (FIG. 12a).

When the hydrogel is in contact with the gas molecules under conditions where hydrate can form, a hydrate shell grows on the surface of the hydrogel as the concentration of gas is highest on the surface. As the hydrate grows inward the thickness of the shell increases and the diffusion of gas molecules into the hydrogel core is limited by the thickening hydrate shell. The decreasing driving force for hydrate formation due to increasing concentration of MEG in hydrogel (self-inhibition), prevents further growth of the hydrate shell (FIG. 12b). Upon dissociation of the hydrate shell, evolved free water molecules are quickly absorbed back into the PAM polymer network and the hydrogel particle recovers its original shape and composition as MEG-PAM hydrogel (FIG. 12c). Depending on the polymer structure and its KHI performance, the hydrate onset time on the surface of the hydrogel can be also delayed.

This example therefore demonstrates that a thermodynamic inhibitor (MEG) can be incorporated into a hydrogel particle which opens up a range of applications in regards to preventing unwanted hydrate formation. The obtained results in this work provide a better understanding of the hydrate formation characteristics on particles, thereby facilitating an improved and/or alternate hydrate management strategy using the MEG-PAM hydrogel particles.

The Inventors consider that this is the first attempt to present the base platform that incorporates the hydrate inhibition strategies. The polymer hydrogel would provide a flexible option to manage the hydrate formation risks by coupling its anti-agglomeration performance with thermodynamic or kinetic hydrate inhibition performance considering the specific aspects of offshore oil and gas fields.

Example 3—Hydrate Formation Studies in a High Pressure Autoclave

The hydrate formation characteristics were studied for the hydrogel particles from Example 2 including the onset time, subcooling temperature, hydrate fraction, and torque changes all of which were compared to bulk water (without hydrogel). The hydrate volume fraction in the presence of hydrogel particles were calculated based on the gas consumption whilst monitoring the torque value on an overhead stirrer during hydrate formation and dissociation.

The gas consumption during hydrate formation was calculated from the pressure difference between monitored moment and calculated pressure with the assumption no hydrate was formed. This procedure has been suggested as a method for hydrate formation study in a flow wheel and an autoclave systems. As noted previously, the hydrate fraction, $\phi_{hyd}$ in the liquid phase at the end of each cycle is acquired from the following equation and hydration number 6.5.

$$\Phi_{hyd} = \frac{V_{hyd}}{V_{hyd} + V_{decane} + (V_w - V_{w,conv})}$$

where $V_w$ is the volume of water, $V_{w,conv}$ is the volume of the water converted to hydrate, $V_{decane}$ is the volume of decane, and $V_{hyd}$ is the volume of hydrate calculated from the molecular weight and density of hydrates calculated at a given time.

Table 3 and Table 4 present the average values and standard deviation over 8 cycles for hydrate volume fraction, hydrate onset time, and subcooling temperature in water+decane mixture without hydrogel and MEG-PAM hydrogel+decane mixture, respectively. The average hydrate onset time was 20.98 min and the average subcooling temperature was 4.89° C. for water and decane mixture. The addition of MEG and hydrogel increased the hydrate onset time to 60.02 min as well as the subcooling temperature to 8.76° C. These results indicate the onset of hydrate crystals and their growth was delayed significantly possibly due to the shift of the hydrate equilibrium condition by adding 20 wt % MEG into the aqueous phase, reducing the thermal driving force to initiate hydrate formation. Here, by absorbing MEG into hydrogels, longer hydrate onset time and higher subcooling temperature were achieved.

TABLE 3

Hydrate formation in water and decane mixture without hydrogel.

| cycle | Water conversion (mol %) | Hydrate volume fraction | $t_{onset}$ (min) | $\Delta T_{sub}$ (K) |
|---|---|---|---|---|
| 1 | 69.28 | 0.47 | 16.33 | 3.70 |
| 2 | 72.10 | 0.48 | 20.50 | 4.70 |
| 3 | 78.01 | 0.51 | 21.83 | 5.10 |

TABLE 3-continued

Hydrate formation in water and decane mixture without hydrogel.

| cycle | Water conversion (mol %) | Hydrate volume fraction | $t_{onset}$ (min) | $\Delta T_{sub}$ (K) |
|---|---|---|---|---|
| 4 | 79.98 | 0.53 | 20.67 | 4.80 |
| 5 | 73.19 | 0.49 | 22.17 | 5.20 |
| 6 | 75.95 | 0.50 | 21.67 | 5.20 |
| 7 | 74.62 | 0.50 | 21.50 | 5.05 |
| 8 | 73.03 | 0.50 | 23.17 | 5.40 |
| Average | 74.52 | 0.50 | 20.98 | 4.89 |
| Standard Deviation | 3.19 | 0.02 | 1.92 | 0.50 |

As presented in Table 3, 74.52 vol. % water conversion occurred in water+decane mixture without the hydrogel (hydrate volume fraction: 0.50). On the other hand, for MEG-PAM-hydrogels with decane, only 20.91% of water was converted to hydrate resulting in a lower hydrate volume fraction of 0.15 in the liquid phase. The concentration of MEG in the hydrogel particles would increase to 23 wt % due to loss of water into hydrate shell, suggesting that the concentration of MEG inside the hydrogel particles increases slightly which would limit the hydrate growth inward i.e. self-inhibition inside the hydrogel particles.

TABLE 4

Hydrate formation in MEG-PAM-hydrogels and decane mixture.

| cycle | Water conversion (%) | Hydrate volume fraction | $t_{onset}$ (min) | $\Delta T_{sub}$ (K) |
|---|---|---|---|---|
| 1 | 17.40 | 0.12 | 60.00 | 7.30 |
| 2 | 12.04 | 0.11 | 68.50 | 8.75 |
| 3 | 24.47 | 0.17 | 28.33 | 2.40 |
| 4 | 23.93 | 0.17 | 33.16 | 3.50 |
| 5 | 24.54 | 0.18 | 67.66 | 10.45 |
| 6 | 20.51 | 0.15 | 68.00 | 11.30 |
| 7 | 26.61 | 0.19 | 75.17 | 12.85 |
| 8 | 17.81 | 0.13 | 79.33 | 13.55 |
| Average | 20.91 | 0.15 | 60.02 | 8.76 |
| Standard Deviation | 4.59 | 0.03 | 17.76 | 3.86 |

Figure 13:
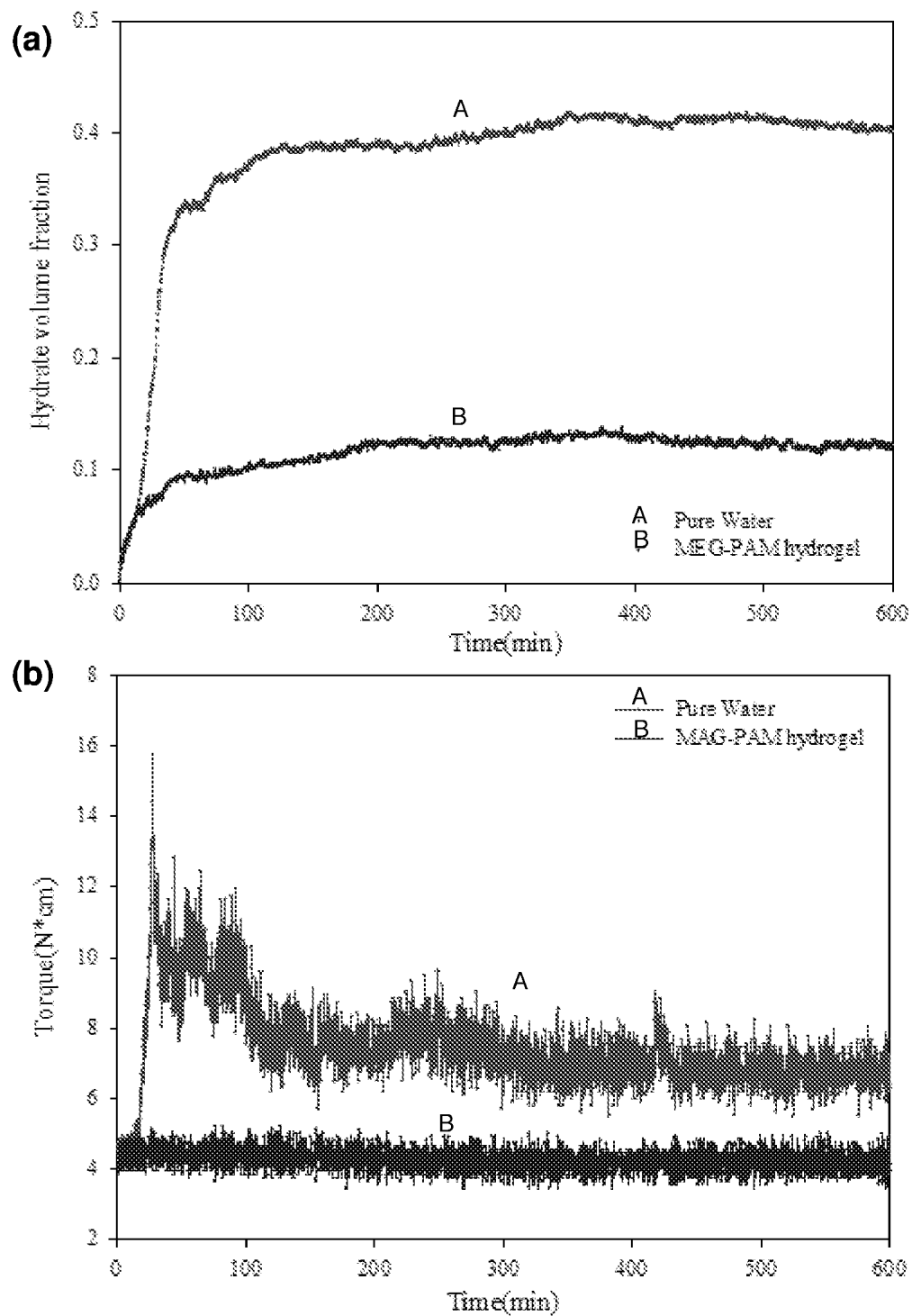
FIG. 13 provides plots of (a) Hydrate volume fraction and (b) torque change of bulk water and MEG-PAM-Hydrogel systems during single cycle FIG. 14 provides plots of torque values for (a) bulk water and (b) MEG-PAM hydrogel for 8 cycles. Each section indicates cycle duration.

Hydrate growth and the accompanying torque changes in the presence and absence of hydrogels are shown in FIG. 13. It was observed that in case of bulk water and decane mixture the torque value peaks from 5 N cm to max. ~15 N cm upon formation and growth of hydrate, this value then fluctuates at around 7 N cm with slight increasing of hydrate fraction.

Figure 14:
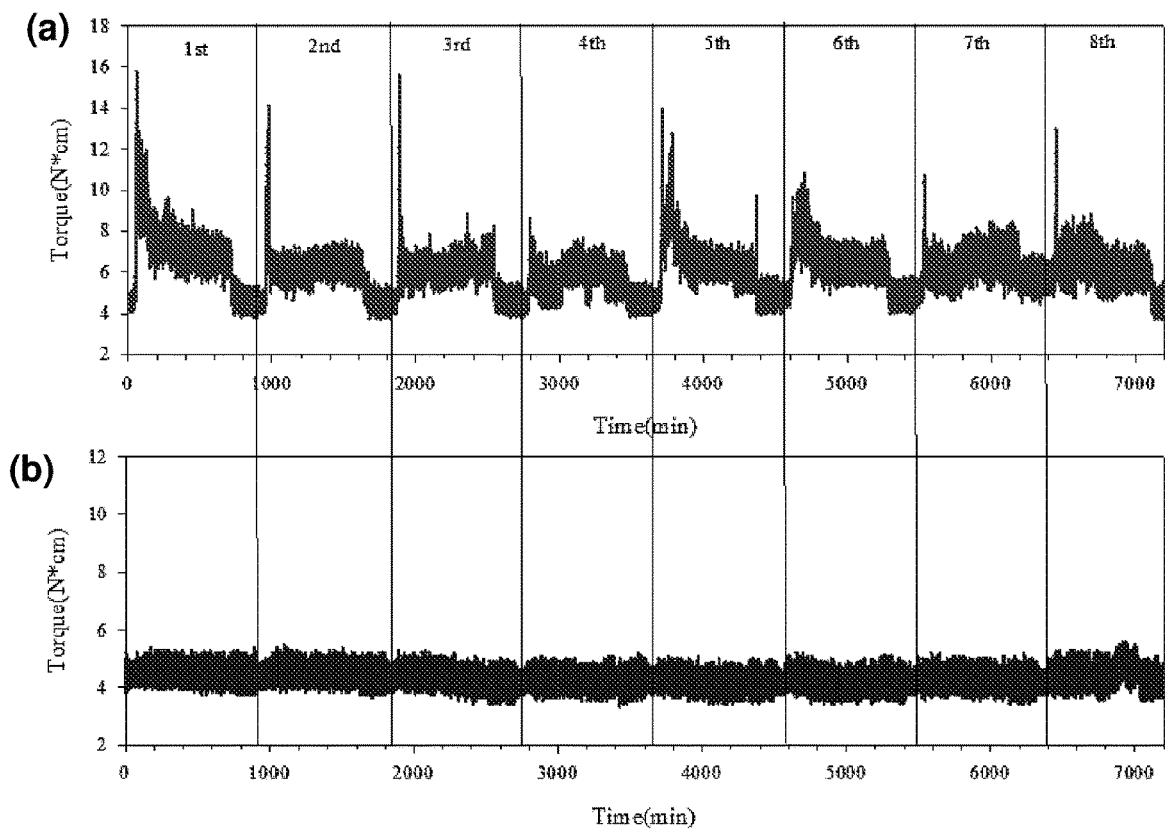

As can be seen in FIG. 14 (a), the torque increases during the early stage of hydrate formation and growth, it then fluctuates at lower torque values in the later stages. This pattern was observed across all 8 cycles of hydrate formation and dissociation. This indicates that the initial hydrate nucleation and growth behave as obstacles which induce the observed increase in torque. However, this effect is not observed in every cycle of the MEG-PAM-hydrogels (FIG. 13 and FIG. 14 (b)) and the torque remain stable at around 4 N cm. This is attributed to the modified surface in MEG-PAM hydrogels, and clearly reveals a different phenomenon compared to the bulk water and decane mixture.

These results suggest that the hydrate shell formation changes the mechanical properties of the hydrogel particles, which in turn prevents the hydrate from agglomerating. In the case of an offshore flowline the formation of a hydrate shell on the surface of water droplets dispersed in a hydrocarbon phase results in agglomeration of the droplets and hydrate blockages. However, the formation of a hydrate shell on the surface of MEG-PAM-hydrogel did not induce an increase in torque, suggesting the particles are well dispersed in the hydrocarbon phase preventing hydrate plug build up and pipeline blockage. In addition, a steady increase in hydrate fraction only results the low hydrate fraction around 0.20 that is lower than that of bulk water.

Example 4—Hydrate Formation Studies in a High Pressure Autoclave

Thermogravimetric Analyses (TGA) of two 10 to 20 mg samples of (a) MEG and water regeneration for a 20% solution of MEG in water and (b) 10% polymer network from the hydrogel were conducted on a Mettler Toledo TGA/STDA851. Each sample was run with a heating rate of 10° C./minute. Nitrogen was used as the environmental gas. Samples were placed in a 70 mm alumina pan.

Figure 15:
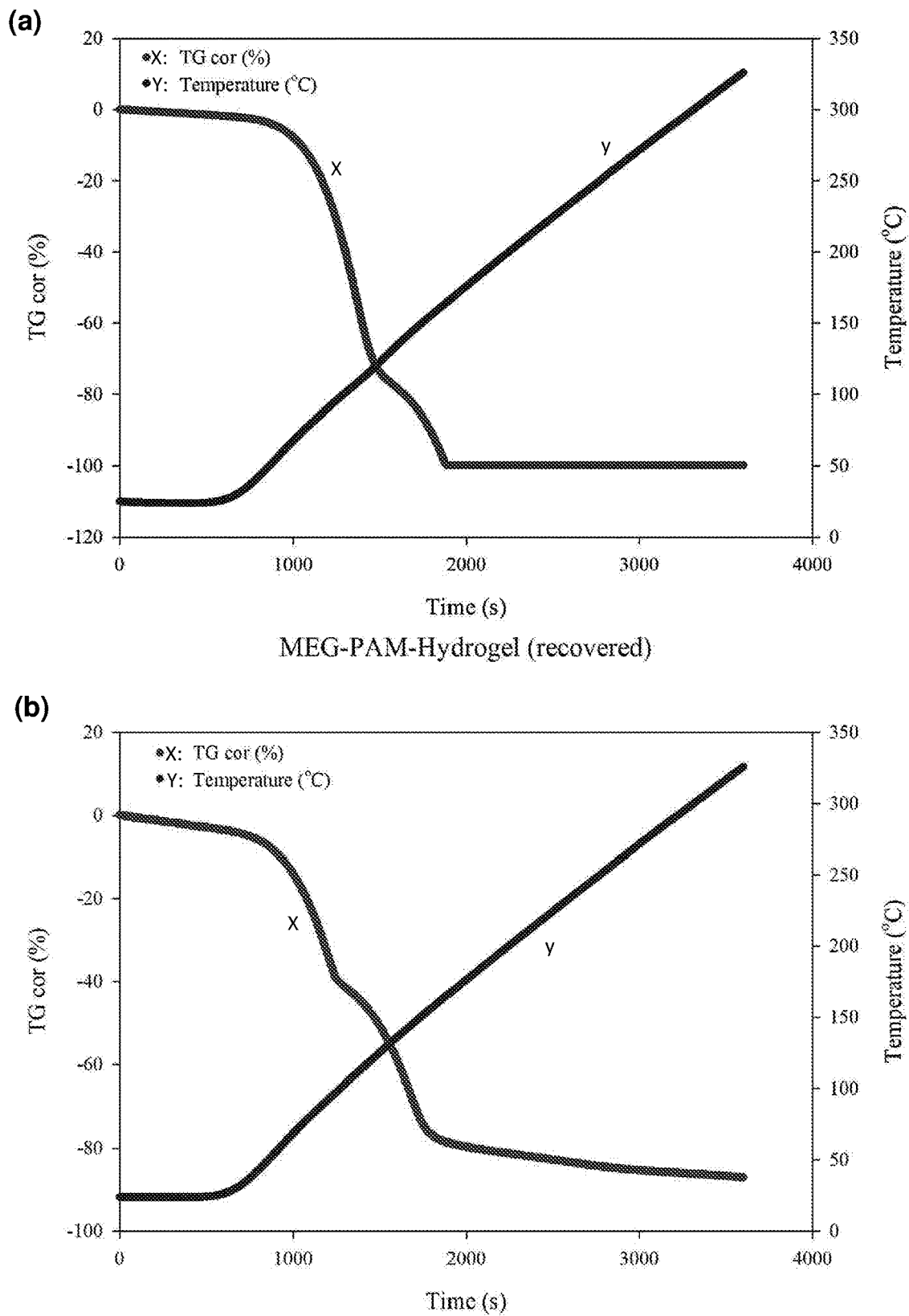
FIGS. 15(a) and 15(b) show the results of a thermogravimetric analysis of (a) MEG and water regeneration for a 20% solution of MEG in water and (b) 10% polymer network from the hydrogel.

FIGS. 15(a) and 15(b) show the results of a thermogravimetric analysis of (a) MEG and water regeneration for a 20% solution of MEG in water and (b) 10% polymer network from the hydrogel. FIG. 15(a) shows for MEG and water regeneration for a 20% solution of MEG in water, the water boils at 100 degree C. whereas the MEG is 197 degree C. The X curve shows the weight loss and as can be seen the water is removed by 100 degree C. (Y curve) and the MEG is removed afterwards. FIG. 15(b) shows for the hydrogel there is 10% polymer network from the hydrogel (x curve) and the y curve shows that the water is also removed at 100 degree C. and the MEG at 197 degree C. Overall, these results show that the presence of the hydrogel does not adversely affect the MEG regeneration temperature.

Example 5—Rheological Measurements

The rheology of bulk gels comprising the hydrogel gas hydrate inhibitor of the present invention were performed using a HR-3 Discovery Hybrid Rheometer (TA Instruments) and a smart swap recessed concentric cylinder geometry with a cup (radius 15 mm) and rotor (radius 14 mm, and height 42 mm). The gap between the bottom of the cup and rotor can be set at 4 mm and heating can be achieved using Peltier heaters.

The polymer concentration was varied from 5, 7.5 and 10 w/v % PAM-co-AA with 15% of the repeat units (or mer-units) on the polymer backbone activated to crosslinking. The PAM-co-AA was first activated with EDC and NHS, then the crosslinker (TREN) was immediately added. 12 mL of the resulting solution was quickly loaded into the measuring geometry so crosslinking could be monitored from the same point for each system. The experiments were performed at 50° C. to ensure that the reactions all reached completion in a reasonable timeframe; however, heating was not a prerequisite for gel formation. A lid was used to cover the cup to minimize evaporation of the water, and to further prevent this mineral oil was poured on the top of the solution and as a result no shrinkage of the hydrogels was observed. Crosslinking was monitored as a function of time and the oscillation frequency was 1 Hz and strain was kept at 0.01%. The experiments were performed for 19.5 h to ensure the crosslinking reaction was complete which was determined as the plateau in the modulus (i.e. the final modulus of the hydrogel after cross-linking) which occurred before 19.5 h. After these experiments, frequency sweeps were conducted on the samples to record the frequency dependence of the moduli and finally strain sweeps were performed to determine if the gels failed under strain. The gels were not removed between the three separate measurements.

Figure 16:
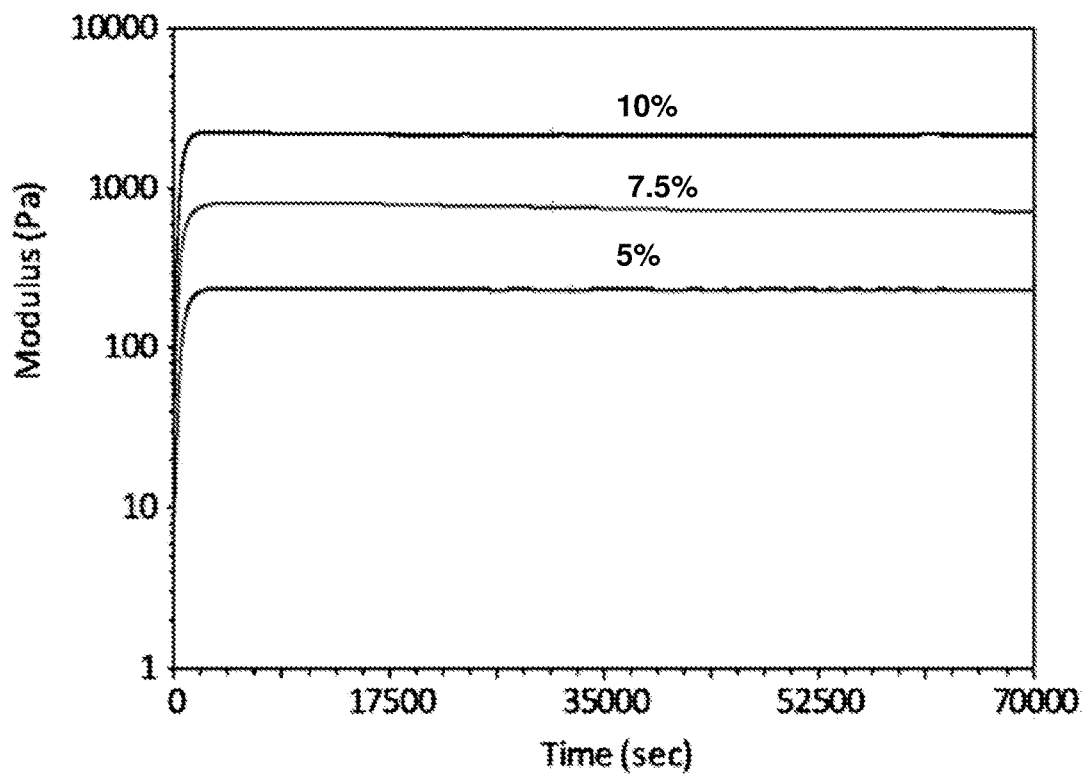
FIG. 16 provides maximum or fully developed modulus (G) for gels crosslinked with TREN at different polymer concentrations (10%, 7.5%, and 5%).

The polymer networks were well developed and resulted in the formation of stable hydrogels that endured a range of condition including the addition of excess water, salt, acid, and base. This demonstrated that the crosslinking reaction was efficient so rheology was used to study the formation of the hydrogel networks. Following the above rheological measurements, final modulus of the hydrogel after crosslinking (i.e. measured and expressed for fully hydrated hydrogel material by the above method and as shown in FIG. 16) was 810 Pa when 7.5 w/v % polymer was used, and 2245 Pa at 10 w/v % concentration which is significantly higher than the 5 w/v % system (230 Pa). Clearly, the network and crosslink densities increased at higher polymer concentrations indicating that mechanical properties are dependent on polymer concentration.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A gas hydrate hydrogel inhibitor comprising at least one polymer hydrogel particle having from 50 to 100% hydrogel content, the at least one polymer hydrogel particle including an inhibitor comprising at least one thermodynamic hydrate inhibitor, at least one kinetic hydrate inhibitor, or a combination thereof.

2. The gas hydrate hydrogel inhibitor according to claim 1, wherein each polymer hydrogel particle comprises from 70 to 100% hydrogel content.

3. The gas hydrate hydrogel inhibitor according to claim 1, wherein the hydrogel particle can typically swell and retain from 50 wt % up to 99 wt % water within the structure of the hydrogel particle.

4. The gas hydrate hydrogel inhibitor according to claim 1, wherein the polymer hydrogel particles contain between 5 and 50 wt % of the thermodynamic inhibitor.

5. The gas hydrate hydrogel inhibitor according to claim 1, wherein the polymer hydrogel particles contain kinetic hydrate inhibitor in aqueous inhibitor solution is from 0.01 to 10 wt.

6. The gas hydrate hydrogel inhibitor according to claim 1, wherein the inhibitor is at least one of: absorbed into or formed with the hydrogel particle.

7. The gas hydrate hydrogel inhibitor according to claim 6, wherein the hydrogel comprises a cross-linked polymer where a polymer network is the inhibitor.

8. The gas hydrate hydrogel inhibitor according to claim 7, wherein a cross-linked polymer structure of the hydrogel comprises between 0.01% and 50% cross-linker, with the remaining content comprising a KHI polymer hydrogel.

9. The gas hydrate hydrogel inhibitor according to claim 1, wherein the thermodynamic hydrate inhibitor comprises methanol, mono-ethylene glycol (MEG), diethylene glycol (DEG) or a combination thereof.

10. The gas hydrate hydrogel inhibitor according to claim 1, wherein the kinetic hydrate inhibitor comprises homo- and co-polymers of at least one of N-vinyl pyrrolidone, N-vinyl caprolactam, vinylcaprolactam, vinylpyrrolidone, vinylpiperidone acryloylpyrrolidine, acryloylmorpholine, aspartamide, Oligomeric amine oxide, N-methyl-N-vinyl acetamide, N-isopropylacrylamide, ethylacryla minde, diethylacrylamide, isobutylacrylamide, isopropylmethacrylamide, butylacrylate or a combination thereof.

11. The gas hydrate hydrogel inhibitor according to claim 1, wherein the kinetic hydrate inhibitor comprises poly (vinylpyrrolidone), polyvinylcaprolactam, polyethyloxazoline, poly-L-proline, polyacryloylpyrrolidine, polyethylmaleimide, ring-opened polyethyloxazoline, ring-closed polyethyloxazoline, polyetherdiamine, polyallyl isopentanamide, polypyrrolidinyl aspartate (polyAS), polyglyoxylpyrrolidine (polyGP), dodecyl-2-(2-caprolactamyl) ethanamide, modified AMPS polymers where $R_1$ is an alkyl tail of 1 to 6 carbon atoms and $R_2$ is H or Me, and wherein n is from 1 to 1000:

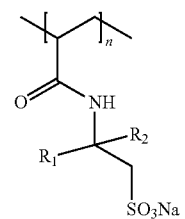

Amidated maleic anhydride copolymers comprising:

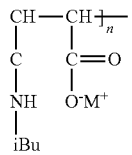

wherein $M^+$ is $H^+$, a metal ion or a quarternary ammonium ion, and wherein n is from 1 to 1000, or a combination thereof.

12. The gas hydrate hydrogel inhibitor according to claim 1, wherein the polymer hydrogel particles comprise aqueous content of between 70 and 99 wt %.

13. The gas hydrate hydrogel inhibitor according to claim 1, wherein the polymer hydrogel particles comprise a polymer content of less than or equal to 15 wt %.

14. The gas hydrate hydrogel inhibitor according to claim 1, wherein the polymer hydrogel particles comprise a cross-linked polymer used as hydrogel comprising a plurality of homogenous polymers comprising: polyacrylic acid, hydrolysed polyacrylamide or polyacrylamide-co-acrylic acid, polyacrylamide-co-acrylic acid partial sodium salt, poly (acrylic acid-co-maleic acid), poly(N-isopropylacrylamide), polyvinylcaprolactam, or polyvinyl N-vinyl caprolactam.

15. A method of forming a gas hydrate hydrogel inhibitor comprising:
providing a plurality of hydrogel particles having from 50 to 100% hydrogel content; and
swelling the hydrogel particles with an aqueous inhibitor solution including an inhibitor comprising: at least one thermodynamic hydrate inhibitor, at least one kinetic hydrate inhibitor or a combination thereof.

16. The method according to claim 15, wherein the inhibitor comprises the at least one thermodynamic hydrate inhibitor and the concentration of the at least one thermodynamic inhibitor in an aqueous inhibitor solution is from 5 to 50 wt %.

17. A method of forming a gas hydrate inhibitor comprising at least one polymer hydrogel particle having from 50 to 100% hydrogel content, the method comprising:
    forming a hydrogel with, around, or with and around at least one inhibitor,
    wherein the inhibitor comprising: at least one thermodynamic hydrate inhibitor, at least one kinetic hydrate inhibitor or a combination thereof.

18. The method according to claim 17, wherein the inhibitor comprises the at least one kinetic hydrate inhibitor and the concentration of the kinetic hydrate inhibitor is from 0.01 to 10 wt %.

19. The method according to claim 15, wherein the hydrogel particles are formed by:
    (i) providing a first solution comprising:
        (a) a polymer having a repeating monomer unit comprising at least two different pendant functional groups, wherein at least one of the at least two pendant functional groups is a carboxyl or activated carboxylate group; and
        (b) a cross-linking agent having at least two pendant functional groups capable of forming a covalent bond with the carboxyl or activated carboxylate group;
    and
    (ii) reacting the cross-linking agent with the polymer so that a cross-linked polymer is formed,
    wherein a desired hydrogel particle size is formed by either:
    suspending the first solution within a second solution, wherein the first solution is immiscible with the second solution, then subsequently reacting the cross-linking agent with the polymer; or
    freeze drying the cross-linked polymer; and then comminuting the freeze dried cross-linked polymer to form dried hydrogel particles of a desired size.

20. The method according to claim 17, wherein the hydrogel particles are formed by:
    (i) providing a first solution comprising:
        (a) a polymer having a repeating monomer unit comprising at least two different pendant functional groups, wherein at least one of the at least two pendant functional groups is a carboxyl or activated carboxylate group; and
        (b) a cross-linking agent having at least two pendant functional groups capable of forming a covalent bond with the carboxyl or activated carboxylate group;
    and
    (ii) reacting the cross-linking agent with the polymer so that a cross-linked polymer is formed,
    wherein a desired hydrogel particle size is formed by either:
    suspending the first solution within a second solution, wherein the first solution is immiscible with the second solution, then subsequently reacting the cross-linking agent with the polymer; or
    freeze drying the cross-linked polymer; and then comminuting the freeze dried cross-linked polymer to form dried hydrogel particles of a desired size.

* * * * *